United States Patent
Shahparnia et al.

(10) Patent No.: US 10,048,775 B2
(45) Date of Patent: Aug. 14, 2018

(54) STYLUS DETECTION AND DEMODULATION

(71) Applicant: APPLE INC., Cupertino, CA (US)

(72) Inventors: Shahrooz Shahparnia, Campbell, CA (US); John Greer Elias, Townsend, DE (US)

(73) Assignee: APPLE INC., Cupertino, CA (US)

( * ) Notice: Subject to any disclaimer, the term of this patent is extended or adjusted under 35 U.S.C. 154(b) by 460 days.

(21) Appl. No.: 13/831,318

(22) Filed: Mar. 14, 2013

(65) Prior Publication Data

US 2014/0267075 A1    Sep. 18, 2014

(51) Int. Cl.
G06F 3/044   (2006.01)
G06F 3/0354  (2013.01)
G06F 3/041   (2006.01)

(52) U.S. Cl.
CPC .......... G06F 3/03545 (2013.01); G06F 3/044 (2013.01); G06F 3/0416 (2013.01)

(58) Field of Classification Search
CPC ....... G06F 3/03545; G06F 2203/04108; G06F 3/03542; G06F 3/044; G06F 3/047; H03K 17/955

See application file for complete search history.

(56) References Cited

U.S. PATENT DOCUMENTS

| | | |
|---|---|---|
| 3,462,692 A | 8/1969 | Bartlett |
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday |

(Continued)

FOREIGN PATENT DOCUMENTS

| | | |
|---|---|---|
| CN | 1243282 A | 2/2000 |
| CN | 1278348 A | 12/2000 |

(Continued)

OTHER PUBLICATIONS

Final Office Action dated Apr. 28, 2014, for U.S. Appl. No. 13/652,007, filed Oct. 15, 2012, 16 pages.

(Continued)

*Primary Examiner* — William Boddie
*Assistant Examiner* — Jeffrey A Parker
(74) *Attorney, Agent, or Firm* — Morrison & Foerster LLP

(57) ABSTRACT

A touch input device configured to detect stylus signals generated by an external stylus is provided. The touch input device includes a plurality of stylus signal detectors that can receive the stylus signal and estimate the start and end time of the stylus signal in order to facilitate windowed demodulation of signal. The touch input device also includes circuitry to determine which of the plurality of detectors is most likely to have received the stylus signal and based on that determination can demodulate the signal and extract data embedded within the stylus signal.

24 Claims, 12 Drawing Sheets

(56) References Cited

U.S. PATENT DOCUMENTS

| | | |
|---|---|---|
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Casewell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,117 A | 5/2000 | Fujimoto |
| 6,064,374 A | 5/2000 | Fukuzaki |
| 6,067,062 A | 5/2000 | Takasu et al. |

(56) References Cited

U.S. PATENT DOCUMENTS

| | | |
|---|---|---|
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,454,482 B1 | 9/2002 | Silverbrook et al. |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,642,238 B2 | 11/2003 | Hester, Jr. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,833 B1* | 3/2006 | Bodenmann ............ G06F 3/038 341/20 |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |

(56) References Cited

U.S. PATENT DOCUMENTS

| | | | |
|---|---|---|---|
| 8,537,126 B2 | 9/2013 | Yousefpor et al. | |
| 8,552,986 B2 | 10/2013 | Wong et al. | |
| 8,581,870 B2 | 11/2013 | Bokma et al. | |
| 8,605,045 B2 | 12/2013 | Mamba et al. | |
| 8,659,556 B2 | 2/2014 | Wilson | |
| 8,698,769 B2 | 4/2014 | Coulson et al. | |
| 8,723,825 B2 | 5/2014 | Wright et al. | |
| 8,816,985 B1 | 8/2014 | Tate et al. | |
| 8,847,899 B2 | 9/2014 | Washburn et al. | |
| 8,928,635 B2 | 1/2015 | Harley et al. | |
| 8,933,899 B2 | 1/2015 | Shahparnia et al. | |
| 9,013,429 B1* | 4/2015 | Krekhovetskyy | G06F 3/03545 345/173 |
| 9,092,086 B2 | 7/2015 | Krah et al. | |
| 9,146,414 B2 | 9/2015 | Chang et al. | |
| 9,170,681 B2 | 10/2015 | Huang et al. | |
| 9,310,923 B2 | 4/2016 | Krah et al. | |
| 9,310,943 B1 | 4/2016 | Omelchuk et al. | |
| 9,329,703 B2 | 5/2016 | Falkenburg et al. | |
| 9,377,905 B1 | 6/2016 | Grivna et al. | |
| 9,519,361 B2 | 12/2016 | Harley et al. | |
| 9,557,845 B2 | 1/2017 | Shahparnia | |
| 9,582,105 B2 | 2/2017 | Krah et al. | |
| 9,652,090 B2 | 5/2017 | Tan et al. | |
| 2001/0000026 A1 | 3/2001 | Skoog | |
| 2001/0000676 A1 | 5/2001 | Zhang et al. | |
| 2001/0003711 A1 | 6/2001 | Coyer | |
| 2001/0044858 A1 | 11/2001 | Rekimoto et al. | |
| 2001/0046013 A1 | 11/2001 | Noritake et al. | |
| 2001/0052597 A1 | 12/2001 | Young et al. | |
| 2001/0055008 A1 | 12/2001 | Young et al. | |
| 2002/0027164 A1 | 3/2002 | Mault et al. | |
| 2002/0030581 A1 | 3/2002 | Janiak et al. | |
| 2002/0030768 A1 | 3/2002 | Wu | |
| 2002/0052192 A1 | 5/2002 | Yamazaki et al. | |
| 2002/0063518 A1 | 5/2002 | Okamoto et al. | |
| 2002/0067845 A1 | 6/2002 | Griffis | |
| 2002/0071074 A1 | 6/2002 | Noritake et al. | |
| 2002/0074171 A1 | 6/2002 | Nakano et al. | |
| 2002/0074549 A1 | 6/2002 | Park et al. | |
| 2002/0080123 A1 | 6/2002 | Kennedy et al. | |
| 2002/0080263 A1 | 6/2002 | Krymski | |
| 2002/0126240 A1 | 9/2002 | Seiki et al. | |
| 2002/0149571 A1 | 10/2002 | Roberts | |
| 2002/0175903 A1 | 11/2002 | Fahraeus et al. | |
| 2003/0020083 A1 | 1/2003 | Hsiung et al. | |
| 2003/0038778 A1 | 2/2003 | Noguera | |
| 2003/0103030 A1 | 6/2003 | Wu | |
| 2003/0103589 A1* | 6/2003 | Nohara | H04B 1/713 375/350 |
| 2003/0117369 A1 | 6/2003 | Spitzer et al. | |
| 2003/0127672 A1 | 7/2003 | Rahn et al. | |
| 2003/0137494 A1 | 7/2003 | Tulbert | |
| 2003/0151569 A1 | 8/2003 | Lee et al. | |
| 2003/0156087 A1 | 8/2003 | den Boer et al. | |
| 2003/0156100 A1 | 8/2003 | Gettemy | |
| 2003/0156230 A1 | 8/2003 | den Boer et al. | |
| 2003/0174256 A1 | 9/2003 | Kim et al. | |
| 2003/0174870 A1 | 9/2003 | Kim et al. | |
| 2003/0179323 A1 | 9/2003 | Abileah et al. | |
| 2003/0183019 A1 | 10/2003 | Chae | |
| 2003/0197691 A1 | 10/2003 | Fujiwara et al. | |
| 2003/0205662 A1 | 11/2003 | den Boer et al. | |
| 2003/0218116 A1 | 11/2003 | den Boer et al. | |
| 2003/0231277 A1 | 12/2003 | Zhang | |
| 2003/0234759 A1 | 12/2003 | Bergquist | |
| 2004/0008189 A1 | 1/2004 | Clapper et al. | |
| 2004/0046900 A1 | 3/2004 | den Boer et al. | |
| 2004/0081205 A1* | 4/2004 | Coulson | H04L 27/2656 370/503 |
| 2004/0095333 A1* | 5/2004 | Morag et al. | 345/173 |
| 2004/0113877 A1 | 6/2004 | Abileah et al. | |
| 2004/0125430 A1 | 7/2004 | Kasajima et al. | |
| 2004/0140962 A1 | 7/2004 | Wang et al. | |
| 2004/0189587 A1 | 9/2004 | Jung et al. | |
| 2004/0191976 A1 | 9/2004 | Udupa et al. | |
| 2004/0252867 A1 | 12/2004 | Lan et al. | |
| 2005/0040393 A1 | 2/2005 | Hong | |
| 2005/0091297 A1 | 4/2005 | Sato et al. | |
| 2005/0110777 A1 | 5/2005 | Geaghan et al. | |
| 2005/0117079 A1 | 6/2005 | Pak et al. | |
| 2005/0134749 A1 | 6/2005 | Abileah | |
| 2005/0146517 A1 | 7/2005 | Robrecht et al. | |
| 2005/0173703 A1 | 8/2005 | Lebrun | |
| 2005/0179706 A1 | 8/2005 | Childers | |
| 2005/0200603 A1 | 9/2005 | Casebolt et al. | |
| 2005/0206764 A1 | 9/2005 | Kobayashi et al. | |
| 2005/0231656 A1 | 10/2005 | den Boer et al. | |
| 2005/0270590 A1 | 12/2005 | Izumi et al. | |
| 2005/0275616 A1 | 12/2005 | Park et al. | |
| 2005/0285985 A1 | 12/2005 | Boer et al. | |
| 2006/0007224 A1 | 1/2006 | Hayashi et al. | |
| 2006/0007336 A1 | 1/2006 | Yamaguchi | |
| 2006/0010658 A1 | 1/2006 | Bigley | |
| 2006/0012580 A1 | 1/2006 | Perski et al. | |
| 2006/0026521 A1 | 2/2006 | Hotelling et al. | |
| 2006/0034492 A1 | 2/2006 | Siegel et al. | |
| 2006/0120013 A1 | 6/2006 | Dioro et al. | |
| 2006/0125971 A1 | 6/2006 | Abileah et al. | |
| 2006/0159478 A1 | 7/2006 | Kikuchi | |
| 2006/0170658 A1 | 8/2006 | Nakamura et al. | |
| 2006/0176288 A1 | 8/2006 | Pittel et al. | |
| 2006/0187367 A1 | 8/2006 | Abileah et al. | |
| 2006/0197753 A1 | 9/2006 | Hotelling | |
| 2006/0202975 A1 | 9/2006 | Chiang | |
| 2006/0249763 A1 | 11/2006 | Mochizuki et al. | |
| 2006/0250381 A1 | 11/2006 | Geaghan | |
| 2006/0279690 A1 | 12/2006 | Yu et al. | |
| 2006/0284854 A1 | 12/2006 | Cheng et al. | |
| 2007/0030258 A1 | 2/2007 | Pittel et al. | |
| 2007/0062852 A1 | 3/2007 | Zachut et al. | |
| 2007/0109239 A1 | 5/2007 | den Boer et al. | |
| 2007/0109286 A1 | 5/2007 | Nakamura et al. | |
| 2007/0131991 A1 | 6/2007 | Sugawa | |
| 2007/0146349 A1 | 6/2007 | Errico et al. | |
| 2007/0216905 A1 | 9/2007 | Han et al. | |
| 2007/0229468 A1 | 10/2007 | Peng et al. | |
| 2007/0279346 A1 | 12/2007 | den Boer et al. | |
| 2007/0285405 A1 | 12/2007 | Rehm | |
| 2007/0291012 A1 | 12/2007 | Chang | |
| 2008/0012835 A1 | 1/2008 | Rimon et al. | |
| 2008/0012838 A1 | 1/2008 | Rimon | |
| 2008/0029691 A1 | 2/2008 | Han | |
| 2008/0046425 A1 | 2/2008 | Perski | |
| 2008/0048995 A1 | 2/2008 | Abileah et al. | |
| 2008/0049153 A1 | 2/2008 | Abileah et al. | |
| 2008/0049154 A1 | 2/2008 | Abileah et al. | |
| 2008/0055507 A1 | 2/2008 | den Boer et al. | |
| 2008/0055295 A1 | 3/2008 | den Boer et al. | |
| 2008/0055496 A1 | 3/2008 | Abileah et al. | |
| 2008/0055497 A1 | 3/2008 | Abileah et al. | |
| 2008/0055498 A1 | 3/2008 | Abileah et al. | |
| 2008/0055499 A1 | 3/2008 | den Boer et al. | |
| 2008/0062156 A1 | 3/2008 | Abileah et al. | |
| 2008/0062157 A1 | 3/2008 | Abileah et al. | |
| 2008/0062343 A1 | 3/2008 | den Boer et al. | |
| 2008/0066972 A1 | 3/2008 | Abileah et al. | |
| 2008/0084374 A1 | 4/2008 | Abileah et al. | |
| 2008/0111780 A1 | 5/2008 | Abileah et al. | |
| 2008/0128180 A1 | 6/2008 | Perski et al. | |
| 2008/0129909 A1 | 6/2008 | den Boer et al. | |
| 2008/0129913 A1 | 6/2008 | den Boer et al. | |
| 2008/0129914 A1 | 6/2008 | den Boer et al. | |
| 2008/0142280 A1 | 6/2008 | Yamamoto et al. | |
| 2008/0158165 A1 | 7/2008 | Geaghan et al. | |
| 2008/0158167 A1 | 7/2008 | Hotelling et al. | |
| 2008/0158172 A1 | 7/2008 | Hotelling et al. | |
| 2008/0158180 A1 | 7/2008 | Krah et al. | |
| 2008/0162997 A1 | 7/2008 | Vu et al. | |
| 2008/0165311 A1 | 7/2008 | Abileah et al. | |
| 2008/0170046 A1 | 7/2008 | Rimon et al. | |
| 2008/0238885 A1 | 10/2008 | Zachut et al. | |
| 2008/0278443 A1 | 11/2008 | Schelling et al. | |
| 2008/0284925 A1 | 11/2008 | Han | |

(56) References Cited

U.S. PATENT DOCUMENTS

| | | |
|---|---|---|
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0000831 A1 | 1/2009 | Miller et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0153152 A1 | 6/2009 | Maharyta et al. |
| 2009/0153525 A1 | 6/2009 | Lung |
| 2009/0167713 A1 | 7/2009 | Edwards |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1* | 4/2010 | King-Smith ........ G06F 3/03545 345/174 |
| 2010/0118237 A1 | 5/2010 | Katoh et al. |
| 2010/0127991 A1 | 5/2010 | Yee |
| 2010/0155153 A1 | 6/2010 | Zachut |
| 2010/0160041 A1 | 6/2010 | Grant et al. |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0309171 A1 | 12/2010 | Hsieh et al. |
| 2010/0315384 A1 | 12/2010 | Hargreaves et al. |
| 2010/0315394 A1 | 12/2010 | Katoh et al. |
| 2010/0321320 A1 | 12/2010 | Hung et al. |
| 2010/0322484 A1 | 12/2010 | Hama et al. |
| 2010/0327882 A1 | 12/2010 | Shahparnia et al. |
| 2010/0328249 A1 | 12/2010 | Ningrat et al. |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0153263 A1 | 6/2011 | Oda et al. |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0193776 A1 | 8/2011 | Oda et al. |
| 2011/0216016 A1 | 9/2011 | Rosener |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304577 A1 | 12/2011 | Brown et al. |
| 2011/0304592 A1 | 12/2011 | Booth et al. |
| 2012/0013555 A1 | 1/2012 | Takami et al. |
| 2012/0019488 A1 | 1/2012 | McCarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1 | 5/2012 | Kremin et al. |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon |
| 2012/0327041 A1 | 12/2012 | Harley |
| 2012/0331546 A1 | 12/2012 | Falkenburg |
| 2013/0021294 A1 | 1/2013 | Maharyta et al. |
| 2013/0027361 A1 | 1/2013 | Perski et al. |
| 2013/0033461 A1 | 2/2013 | Silverbrook |
| 2013/0069905 A1 | 3/2013 | Krah et al. |
| 2013/0088465 A1 | 4/2013 | Geller et al. |
| 2013/0100071 A1 | 4/2013 | Wright et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0155007 A1 | 6/2013 | Huang et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028576 A1 | 1/2014 | Shahparnia |
| 2014/0028577 A1 | 1/2014 | Krah |
| 2014/0028607 A1 | 1/2014 | Tan |
| 2014/0077827 A1 | 3/2014 | Seguine |
| 2014/0132556 A1 | 5/2014 | Huang et al. |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0184554 A1 | 7/2014 | Walley |
| 2014/0253462 A1 | 9/2014 | Hicks |
| 2014/0253469 A1 | 9/2014 | Hicks et al. |
| 2014/0267071 A1 | 9/2014 | Shahparnia |
| 2014/0267184 A1 | 9/2014 | Bathiche et al. |
| 2014/0347311 A1 | 11/2014 | Joharapurkar et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |
| 2015/0177868 A1 | 6/2015 | Morein et al. |
| 2015/0338950 A1 | 11/2015 | Ningrat et al. |
| 2016/0077667 A1 | 3/2016 | Chiang et al. |
| 2016/0162011 A1 | 6/2016 | Verma et al. |
| 2016/0162101 A1 | 6/2016 | Pant et al. |
| 2016/0162102 A1 | 6/2016 | Shahparnia et al. |
| 2016/0179281 A1 | 6/2016 | Krah et al. |
| 2016/0357343 A1 | 12/2016 | Falkenburg et al. |
| 2016/0378220 A1 | 12/2016 | Westhues et al. |
| 2017/0097695 A1 | 4/2017 | Ribeiro et al. |

(56) References Cited

U.S. PATENT DOCUMENTS

| | | | |
|---|---|---|---|
| 2017/0115816 A1 | 4/2017 | Chang | |
| 2017/0344174 A1 | 11/2017 | Pant et al. | |

FOREIGN PATENT DOCUMENTS

| | | | |
|---|---|---|---|
| CN | 1518723 | A | 8/2004 |
| CN | 201329722 | Y | 10/2009 |
| CN | 101393488 | B | 10/2010 |
| CN | 201837984 | U | 5/2011 |
| DE | 036 02 796 | A1 | 8/1987 |
| DE | 197 20 925 | A1 | 12/1997 |
| EP | 0 306 596 | A2 | 3/1989 |
| EP | 0 366 913 | B1 | 5/1990 |
| EP | 0 384 509 | B1 | 8/1990 |
| EP | 0 426 362 | A2 | 5/1991 |
| EP | 0 426 469 | A2 | 5/1991 |
| EP | 0 464 908 | B1 | 1/1992 |
| EP | 0 488 455 | B1 | 6/1992 |
| EP | 0 490 683 | B1 | 6/1992 |
| EP | 0 491 436 | B1 | 6/1992 |
| EP | 0 509 589 | B1 | 10/1992 |
| EP | 0 545 709 | B1 | 6/1993 |
| EP | 0 572 009 | A1 | 12/1993 |
| EP | 0 572 182 | B1 | 12/1993 |
| EP | 0 587 236 | B1 | 3/1994 |
| EP | 0 601 837 | B1 | 6/1994 |
| EP | 0 618 527 | B1 | 10/1994 |
| EP | 0 633 542 | B1 | 1/1995 |
| EP | 0 762 319 | A2 | 3/1997 |
| EP | 0 762 319 | A3 | 3/1997 |
| EP | 0 770 971 | A2 | 5/1997 |
| EP | 0 962 881 | A2 | 12/1999 |
| EP | 1 022 675 | A2 | 7/2000 |
| EP | 1 128 170 | A1 | 8/2001 |
| EP | 1 834 863 | A1 | 2/2003 |
| EP | 2 040 149 | A2 | 3/2009 |
| EP | 2 172 834 | A2 | 4/2010 |
| EP | 2 221 659 | A1 | 8/2010 |
| EP | 2 660 689 | A1 | 11/2013 |
| JP | 55-074635 | A | 6/1980 |
| JP | 57-203129 | A | 12/1982 |
| JP | 60-179823 | A | 9/1985 |
| JP | 64-006927 | U | 1/1989 |
| JP | 64-040004 | U | 2/1989 |
| JP | 1-196620 | A | 8/1989 |
| JP | 2-182581 | A | 7/1990 |
| JP | 2-211421 | A | 8/1990 |
| JP | 5-019233 | A | 1/1993 |
| JP | 5-173707 | A | 7/1993 |
| JP | 05-243547 | A | 9/1993 |
| JP | 8-166849 | A | 6/1996 |
| JP | 9-001279 | A | 1/1997 |
| JP | 9-185457 | A | 7/1997 |
| JP | 9-231002 | A | 9/1997 |
| JP | 9-274537 | A | 10/1997 |
| JP | 10-027068 | A | 1/1998 |
| JP | 10-040004 | A | 2/1998 |
| JP | 10-133817 | A | 5/1998 |
| JP | 10-133819 | A | 5/1998 |
| JP | 10-186136 | A | 7/1998 |
| JP | 10-198515 | A | 7/1998 |
| JP | 11-110110 | A | 4/1999 |
| JP | 11-242562 | A | 9/1999 |
| JP | 2000-020241 | A | 1/2000 |
| JP | 2000-163031 | A | 6/2000 |
| JP | 2002-342033 | A | 11/2002 |
| JP | 2005-129948 | A | 5/2005 |
| JP | 2005-352490 | A | 12/2005 |
| JP | 2009-054141 | A | 3/2009 |
| KR | 10-2013-0028360 | A | 3/2013 |
| KR | 10-2013-0109207 | A | 10/2013 |
| TW | 200743986 | A | 12/2007 |
| TW | 200925944 | A | 6/2009 |
| TW | 201115414 | A | 5/2011 |
| TW | 201118682 | A1 | 6/2011 |
| TW | 201324242 | A1 | 6/2013 |
| TW | 201419103 | A | 5/2014 |
| TW | 201504874 | A | 2/2015 |
| WO | WO-97/40488 | A1 | 10/1997 |
| WO | WO-99/21160 | A1 | 4/1999 |
| WO | WO-99/22338 | A1 | 5/1999 |
| WO | WO-01/45283 | A1 | 6/2001 |
| WO | WO-2006/104214 | A1 | 10/2006 |
| WO | WO-2007/145346 | A1 | 12/2007 |
| WO | WO-2007/145347 | A1 | 12/2007 |
| WO | WO-2008/018201 | A1 | 2/2008 |
| WO | WO-2008/044368 | A1 | 4/2008 |
| WO | WO-2008/044369 | A1 | 4/2008 |
| WO | WO-2008/044370 | A1 | 4/2008 |
| WO | WO-2008/044371 | A1 | 4/2008 |
| WO | WO-2008/047677 | A1 | 4/2008 |
| WO | WO-2009/081810 | A1 | 7/2009 |
| WO | WO-2011/008533 | A2 | 1/2011 |
| WO | WO-2012/177567 | A1 | 12/2012 |
| WO | WO-2012/177571 | A1 | 12/2012 |
| WO | WO-2012/177573 | A2 | 12/2012 |
| WO | WO-2012/177569 | A2 | 3/2013 |
| WO | WO-2012/177569 | A3 | 3/2013 |
| WO | WO-2014/018233 | A1 | 1/2014 |
| WO | WO-2014/143430 | A1 | 9/2014 |
| WO | WO-2015/017196 | A1 | 2/2015 |

OTHER PUBLICATIONS

Non-Final Office Action dated Jun. 27, 2014, for U.S. Appl. No. 13/166,699, filed Jun. 22, 2011, 13 pages.
International Search Report dated Oct. 30, 2014, for PCT Application No. PCT/US2014/047658, filed Jul. 22, 2014, four pages.
Non-Final Office Action dated May 8, 2014, for U.S. Appl. No. 13/560,973, filed Jul. 27, 2012, six pages.
Notice of Allowance dated May 12, 2014, for U.S. Appl. No. 13/166,726, filed Jun. 22, 2011, nine pages.
Final Office Action dated Jul. 14, 2014, for U.S. Appl. No. 13/166,711, filed Jun. 22, 2011, 12 pages.
Search Report dated Jun. 12, 2014, for ROC (Taiwan) Patent Application No. 101122110, one page.
International Search Report dated Apr. 23, 2014, for PCT Application No. PCT/US2014/013927, filed Jan. 30, 2014, four pages.
Non-Final Office Action dated Apr. 24, 2014, for U.S. Appl. No. 13/560,958, filed Jul. 27, 2012, nine pages.
Final Office Action dated Dec. 2, 2014, for U.S. Appl. No. 13/560,963, filed Jul. 27, 2012, ten pages.
Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated Jan. 13, 2014, for U.S. Appl. No. 12/568,316, filed Sep. 28, 2009, 15 pages.
Non-Final Office Action dated Sep. 18, 2013, for U.S. Appl. No. 13/652,007, filed Oct. 15, 2012, 16 pages.
Non-Final Office Action dated Dec. 16, 2013, for U.S. Appl. No. 13/166,711, filed Jun. 22, 2011, 12 pages.
Non-Final Office Action dated Feb. 27, 2014, for U.S. Appl. No. 11/977,279, filed Oct. 24, 2007, 11 pages.
Non-Final Office Action dated Mar. 14, 2014, for U.S. Appl. No. 11/977,339, filed Oct. 24, 2007, 10 pages.
Notice of Allowance dated Feb. 3, 2014, for U.S. Appl. No. 13/166,726, filed Jun. 22, 2011, nine pages.

(56) References Cited

OTHER PUBLICATIONS

TW Search Report dated Jul. 8, 2014, for TW Patent Application No. 101122107, filed Jun. 20, 2012, one page.
Notice of Allowance dated Sep. 4, 2014, for U.S. Appl. No. 13/166,726, filed Jun. 22, 2011, nine pages.
TW Search Report dated Jul. 7, 2014, for TW Patent Application No. 101122109, filed Jun. 20, 2012, one page.
Abileah, A. et al. (2004). "59.3: Integrated Optical Touch Panel in a 14.1' AMLCD," *SID '04 Digest* (Seattle) pp. 1544-1547.
Abileah, A. et al. (2006). "9.3: Optical Sensors Embedded within AMLCD Panel: Design and Applications," *ADEAC '06, SID* (Atlanta) pp. 102-105.
Abileah, A. et al. (2007). "Optical Sensors Embedded within AMLCD Panel: Design and Applications," *Siggraph-07*, San Diego, 5 pages.
Anonymous. (2002). "Biometric Smart Pen Project," located at http://www.biometricsmartpen.de/ . . . , last visited Apr. 19, 2011, one page.
Bobrov, Y. et al. (2002). "5.2 Manufacturing of a Thin-Film LCD," *Optiva, Inc.*, San Francisco, CA. 4 pages.
Brown, C. et al. (2007). "7.2: A 2.6 inch VGA LCD with Optical Input Function using a 1-Transistor Active-Pixel Sensor," *ISSCC 2007* pp. 132-133, 592.
Den Boer, W. et al. (2003). "56.3: Active Matrix LCD with Integrated Optical Touch Screen," *SID '03 Digest* (Baltimore) pp. 1-4.
Echtler, F. et al. (Jan. 2010). "An LED-based Multitouch Sensor for LCD Screens," Cambridge, MA *ACM* 4 pages.
Final Office Action dated Mar. 4, 2004, for U.S. Appl. No. 10/217,798, filed Aug. 12, 2002, 17 pages.
Final Office Action dated Jan. 21, 2005, for U.S. Appl. No. 10/329,217, filed Dec. 23, 2002, 13 pages.
Final Office Action dated Aug. 9, 2005, for U.S. Appl. No. 10/442,433, filed May 20, 2003, six pages.
Final Office Action dated Aug. 23, 2005, for U.S. Appl. No. 10/217,798, filed Aug. 12, 2002, 10 pages.
Final Office Action dated Dec. 13, 2005, for U.S. Appl. No. 10/371,413, filed Feb. 20, 2003, six pages.
Final Office Action dated May 23, 2007, for U.S. Appl. No. 11/137,753, filed May 25, 2005, 11 pages.
Final Office Action dated Oct. 18, 2007, for U.S. Appl. No. 11/351,098, filed Feb. 8, 2006, six pages.
Final Office Action dated Oct. 31, 2007, for U.S. Appl. No. 10/217,798, filed Aug. 12, 2002, nine pages.
Final Office Action dated Mar. 24, 2009, for U.S. Appl. No. 11/351,098, filed Feb. 8, 2006, 10 pages.
Final Office Action dated Feb. 10, 2011, for U.S. Appl. No. 11/901,649, filed Sep. 18, 2007, 20 pages.
Final Office Action dated May 18, 2011, for U.S. Appl. No. 11/978,031, filed Oct. 25, 2007, 17 pages.
Final Office Action dated Jun. 15, 2011, for U.S. Appl. No. 11/595,071, filed Nov. 8, 2006, 9 pages.
Final Office Action dated Jun. 24, 2011, for U.S. Appl. No. 11/978,006, filed Oct. 25, 2007, 12 pages.
Final Office Action dated Jul. 5, 2011, for U.S. Appl. No. 11/977,279, filed Oct. 24, 2007, 12 pages.
Final Office Action dated Sep. 29, 2011, for U.S. Appl. No. 11/977,911, filed Oct. 26, 2007, 22 pages.
Final Office Action dated Oct. 11, 2012, for U.S. Appl. No. 12/566,455, filed Sep. 24, 2009, 8 pages.
Final Office Action dated Oct. 25, 2012, for U.S. Appl. No. 12/568,302, filed Sep. 28, 2009, 13 pages.
Final Office Action dated Oct. 25, 2012, for U.S. Appl. No. 12/568,316, filed Sep. 28, 2009, 15 pages.
Final Office Action dated Jul. 26, 2013, for U.S. Appl. No. 13/166,726, filed Jun. 22, 2011, ten pages.
Final Office Action dated Oct. 31, 2013, for U.S. Appl. No. 13/166,699, filed Jun. 22, 2011, 13 pages.
Hong, S.J. et al. (2005). "Smart LCD Using a-Si Photo Sensor," *IMID '05 Digest* pp. 280-283.
International Preliminary Report on Patentability and Written Opinion dated Oct. 8, 2004, for PCT Application No. PCT/US03/05300, filed Feb. 20, 2003, 15 pages.
International Preliminary Report on Patentability and Written Opinion dated Dec. 30, 2004, for PCT Application No. PCT/US02/25573, filed Aug. 12, 2002, 16 pages.
International Preliminary Report on Patentability and Written Opinion dated May 14, 2008, for PCT Application No. PCT/US06/43741, filed Nov. 10, 2006, four pages.
International Search Report dated Apr. 14, 2003, for PCT Application No. PCT/US02/25573, filed Aug. 12, 2002 two pages.
International Search Report dated Jun. 16, 2003, for PCT Application No. PCT/US03/05300, filed Feb. 20, 2003, two pages.
International Search Report dated Nov. 11, 2003, for PCT Application No. PCT/US03/03277, filed Feb. 4, 2003, three pages.
International Search Report dated Sep. 21, 2007, for PCT Application No. PCT/US06/43741, filed Nov. 10, 2006, one page.
International Search Report dated Oct. 17, 2012, for PCT Application No. PCT/US2012/043019, filed Jun. 18, 2012, five pages.
International Search Report dated Oct. 17, 2012, for PCT Application No. PCT/US2012/043023, filed Jun. 18, 2012, six pages.
International Search Report dated Jan. 16, 2013, for PCT Application No. PCT/US2012/043021, filed Jun. 18, 2012, six pages.
International Search Report dated Sep. 12, 2013, for PCT Application No. PCT/US2013/048977, filed Jul. 1, 2013, six pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Non-Final Office Action dated Jun. 4, 2003, for U.S. Appl. No. 10/217,798, filed Aug. 12, 2002, 16 pages.
Non-Final Office Action dated May 21, 2004, for U.S. Appl. No. 10/329,217, filed Dec. 23, 2002, 13 pages.
Non-Final Office Action dated Sep. 21, 2004, for U.S. Appl. No. 10/442,433, filed May 20, 2003, six pages.
Non-Final Office Action dated Nov. 26, 2004, for U.S. Appl. No. 10/307,106, filed Nov. 27, 2002, eight pages.
Non-Final Office Action dated Dec. 10, 2004, for U.S. Appl. No. 10/217,798, filed Aug. 12, 2002, nine pages.
Non-Final Office Action dated Jan. 21, 2005, for U.S. Appl. No. 10/347,149, filed Jan. 17, 2003, nine pages.
Non-Final Office Action dated Apr. 15, 2005, for U.S. Appl. No. 10/371,413, filed Feb. 20, 2003, four pages.
Non-Final Office Action dated Jun. 22, 2005, for U.S. Appl. No. 10/739,455, filed Dec. 17, 2003, 10 pages.
Non-Final Office Action dated Jul. 12, 2005, for U.S. Appl. No. 10/347,149, filed Jan. 17, 2003, four pages.
Non-Final Office Action dated Jan. 13, 2006, for U.S. Appl. No. 10/217,798, filed Aug. 12, 2002, nine pages.
Non-Final Office Action dated May 12, 2006, for U.S. Appl. No. 10/217,798, filed Aug. 12, 2002, seven pages.
Non-Final Office Action dated Aug. 28, 2006, for U.S. Appl. No. 10/371,413, filed Feb. 20, 2003, six pages.
Non-Final Office Action dated Jun. 28, 2007, for U.S. Appl. No. 11/351,098, filed Feb. 8, 2006, 12 pages.
Non-Final Office Action dated Jun. 29, 2007, for U.S. Appl. No. 10/217,798, filed Aug. 12, 2002, 10 pages.
Non-Final Office Action dated Feb. 25, 2008, for U.S. Appl. No. 11/137,753, filed May 25, 2005, 15 pages.
Non-Final Office Action dated Jun. 24, 2008, for U.S. Appl. No. 11/351,098, filed Feb. 8, 2006, 11 pages.
Non-Final Office Action dated Jun. 25, 2009, for U.S. Appl. No. 11/980,029, filed Oct. 29, 2007, 9 pages.
Non-Final Office Action dated Nov. 23, 2009, for U.S. Appl. No. 11/407,545, filed Apr. 19, 2006, five pages.
Non-Final Office Action dated Jul. 29, 2010, for U.S. Appl. No. 11/901,649, filed Sep. 18, 2007, 20 pages.
Non-Final Office Action dated Oct. 13, 2010, for U.S. Appl. No. 11/978,006, filed Oct. 25, 2007, eight pages.
Non-Final Office Action dated Oct. 14, 2010, for U.S. Appl. No. 11/595,071, filed Nov. 8, 2006, seven pages.

(56) References Cited

OTHER PUBLICATIONS

Non-Final Office Action dated Nov. 26, 2010, for U.S. Appl. No. 11/977,279, filed Oct. 24, 2007, nine pages.
Non-Final Office Action dated Nov. 26, 2010, for U.S. Appl. No. 11/977,830, filed Oct. 26, 2007, seven pages.
Non-Final Office Action dated Dec. 13, 2010, for U.S. Appl. No. 11/977,339, filed Oct. 24, 2007, eight pages.
Non-Final Office Action dated Feb. 1, 2011, for U.S. Appl. No. 11/978,031, filed Oct. 25, 2007, 18 pages.
Non-Final Office Action dated Apr. 29, 2011, for U.S. Appl. No. 11/977,911, filed Oct. 26, 2007, 19 pages.
Non-Final Office Action dated Jun. 21, 2011, for U.S. Appl. No. 11/977,339, filed Oct. 24, 2007, 10 pages.
Non-Final Office Action dated Jun. 28, 2011, for U.S. Appl. No. 12/852,883, filed Aug. 8, 2010, 16 pages.
Non-Final Office Action dated Nov. 2, 2011, for U.S. Appl. No. 12/568,316, filed Sep. 28, 2009, 31 pages.
Non-Final Office Action dated Nov. 4, 2011, for U.S. Appl. No. 12/568,302, filed Sep. 28, 2009, 29 pages.
Non-Final Office Action dated Nov. 17, 2011, for U.S. Appl. No. 11/977,339, filed Oct. 24, 2007, nine pages.
Non-Final Office Action dated Jan. 10, 2012, for U.S. Appl. No. 11/977,864, filed Oct. 26, 2007, six pages.
Non-Final Office Action dated Jan. 31, 2012, for U.S. Appl. No. 12/566,477, filed Sep. 24, 2009, 11 pages.
Non-Final Office Action dated Feb. 29, 2012, for U.S. Appl. No. 11/978,031, filed Oct. 25, 2007, 20 pages.
Non-Final Office Action dated Apr. 20, 2012, for U.S. Appl. No. 12/566,455, filed Sep. 24, 2009, eight pages.
Non-Final Office Action dated Jun. 5, 2012, for U.S. Appl. No. 11/595,071, filed Nov. 8, 2006, 14 pages.
Non-Final Office Action dated Jun. 19, 2012, for U.S. Appl. No. 11/977,864, filed Oct. 26, 2007, seven pages.
Non-Final Office Action dated Nov. 15, 2012, for U.S. Appl. No. 12/566,477, filed Sep. 24, 2009, 11 pages.
Non-Final Office Action dated Mar. 5, 2013, for U.S. Appl. No. 13/166,726, filed Jun. 22, 2011, 14 pages.
Non-Final Office Action dated Mar. 29, 2013, for U.S. Appl. No. 13/166,699, filed Jun. 22, 2011, 12 pages.
Non-Final Office Action dated Jun. 17, 2013, for U.S. Appl. No. 13/166,711, filed Jun. 22, 2011, 8 pages.
Notification of Reasons for Rejection dated Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708, filed Nov. 14, 2005, by den Boer et al.
U.S. Appl. No. 60/821,325, filed Aug. 3, 2006, by Abileah et al.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.
Non-Final Office Action dated Jun. 4, 2014, for U.S. Appl. No. 13/560,963, filed Jul. 27, 2012, nine pages.
Final Office Action dated Jan. 12, 2015, for U.S. Appl. No. 13/560,973, filed Jul. 27, 2012, six pages.
Non-Final Office Action dated Jan. 30, 2015, for U.S. Appl. No. 13/166,711, filed Jun. 22, 2011, 12 pages.
Chinese Search Report dated Oct. 23, 2015, for CN Application No. CN 201280030351.6, with English translation, four pages.
Non-Final Office Action dated Dec. 4, 2015, for U.S. Appl. No. 14/333,461, filed Jul. 16, 2014, 15 pages.
Notice of Allowance dated Dec. 15, 2015, for U.S. Appl. No. 13/560,973, filed Jul. 27, 2012, nine pages.
TW Search Report dated Nov. 20, 2015, for TW Patent Application No. 103126285, one page.
Chinese Search Report dated Sep. 6, 2015, for CN Application No. CN 201280030349.9, with English translation, six pages.
Final Office Action dated Aug. 20, 2015, for U.S. Appl. No. 13/166,711, filed Jun. 22, 2011, six pages.
Non-Final Office Action dated May 14, 2015, for U.S. Appl. No. 13/560,963, filed Jul. 27, 2012, twelve pages.
Non-Final Office Action dated Aug. 28, 2015, for U.S. Appl. No. 13/560,958, filed Jul. 27, 2012, 11 pages.
Non-Final Office Action dated Sep. 24, 2015, for U.S. Appl. No. 13/166,699, filed Jun. 22, 2011, 14 pages.
Final Office Action dated May 4, 2017, for U.S. Appl. No. 15/144,615, filed May 2, 2016, five pages.
Final Office Action dated Jun. 21, 2017, for U.S. Appl. No. 14/333,382, filed Jul. 16, 2014, 17 pages.
European Search Report dated May 2, 2016, for EP Application No. 15196245.3, filed Nov. 25, 2015, twelve pages.
Final Office Action dated Jun. 3, 2016, for U.S. Appl. No. 14/333,461, filed Jul. 16, 2014, eight pages.
Non-Final Office Action dated May 13, 2016, for U.S. Appl. No. 15/057,035, filed Feb. 29, 2016, six pages.
Non-Final Office Action dated May 17, 2016, for U.S. Appl. No. 14/333,382, filed Jul. 16, 2014, sixteen pages.
Non-Final Office Action dated Jul. 1, 2016, for U.S. Appl. No. 14/333,457, filed Jul. 16, 2014, 27 pages.
Non-Final Office Action dated Jul. 28, 2016, for U.S. Appl. No. 13/560,963, filed Jul. 27, 2012, twelve pages.
Non-Final Office Action dated Sep. 27, 2016, for U.S. Appl. No. 15/144,615, filed May 2, 2016, five pages.
Non-Final Office Action dated Oct. 20, 2016, for U.S. Appl. No. 13/166,699, filed Jun. 22, 2011, 16 pages.
Non-Final Office Action dated Jan. 11, 2017, for U.S. Appl. No. 14/869,982, filed Sep. 29, 2015, nine pages.
Non-Final Office Action dated Jan. 12, 2017, for U.S. Appl. No. 14/869,980, filed Sep. 29, 2015, ten pages.
Non-Final Office Action dated Jan. 23, 2017, for U.S. Appl. No. 14/333,382, filed Jul. 16, 2014, sixteen pages.
Non-Final Office Action dated Apr. 6, 2107, for U.S. Appl. No. 14/333,461, filed Jul. 16, 2014, six pages.
Notice of Allowance dated May 24, 2016, for U.S. Appl. No. 13/560,958, filed Jul. 27, 2012, ten pages.
Notice of Allowance dated Aug. 10, 2016, for U.S. Appl. No. 14/578,051, filed Dec. 19, 2014, seven pages.
Notice of Allowance dated Sep. 9, 2016, for U.S. Appl. No. 13/560,958, filed Jul. 27, 2012, eight pages.
Notice of Allowance dated Oct. 31, 2016, for U.S. Appl. No. 15/057,035, filed Feb. 29, 2016, ten pages.
Notice of Allowance dated Feb. 14, 2017, for U.S. Appl. No. 13/560,963, filed Jul. 27, 2012, nine pages.
TW Search Report dated Jun. 23, 2016, for TW Patent Application No. 104135140, with English Translation, two pages.
Final Office Action dated May 31, 2017, for U.S. Appl. No. 13/166,699, filed Jun. 22, 2011, 16 pages.
Final Office Action dated Feb. 1, 2016, for U.S. Appl. No. 13/560,963, filed Jul. 27, 2012, 12 pages.
Final Office Action dated Feb. 3, 2016, for U.S. Appl. No. 13/166,699, filed Jun. 22, 2011, 15 pages.
Non-Final Office Action dated Feb. 11, 2016, for U.S. Appl. No. 14/578,051, filed Dec. 19, 2014, nine pages.
Notice of Allowance dated Jan. 14, 2016, for U.S. Appl. No. 13/166,711, filed Jun. 22, 2011, five pages.
Non-Final Office Action dated Jan. 2, 2018, for U.S. Appl. No. 14/869,980, filed Sep. 29, 2015, eleven pages.
Non-Final Office Action dated Jan. 17, 2018, for U.S. Appl. No. 14/869,975, filed Sep. 29, 2015, 17 pages.
Final Office Action dated Aug. 7, 2017, for U.S. Appl. No. 14/869,980, filed Sep. 29, 2015, twelve pages.
Final Office Action dated Aug. 16, 2017, for U.S. Appl. No. 14/869,982, filed Sep. 29, 2015, ten pages.
Final Office Action dated Nov. 30, 2017, for U.S. Appl. No. 14/333,457, filed Jul. 16, 2014, 22 pages.

(56) References Cited

OTHER PUBLICATIONS

Non-Final Office Action dated Dec. 14, 2017, for U.S. Appl. No. 15/169,679, filed May 31, 2016, 24 pages.
Notice of Allowance dated Oct. 26, 2107, for U.S. Appl. No. 14/333,461, filed Jul. 16, 2014, seven pages.
Notice of Allowance dated Nov. 9, 2017, for U.S. Appl. No. 14/333,382, filed Jul. 16, 2014, eight pages.
Notice of Allowance dated Nov. 29, 2017, for U.S. Appl. No. 15/144,615, filed May 2, 2016, eight pages.
Final Office Action dated Dec. 16, 2014, for U.S. Appl. No. 13/560,958, filed Jul. 27, 2012, 12 pages.
Final Office Action dated May 4, 2015, for U.S. Appl. No. 13/166,699, filed Jun. 22, 2011, 17 pages.

\* cited by examiner

STYLUS DETECTION AND DEMODULATION

FIELD

This relates generally to touch sensitive devices and, more specifically, to touch sensitive devices which can also accept input from a stylus.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. Most conventional styli simply include a bulky tip made of a material capable of interacting with the touch sensitive device in a manner resembling a user's finger. As a result, conventional styli lack the precision and control of traditional writing instruments. A stylus capable of receiving stimulation and force signals and generating stylus stimulation signals that can be transmitted to the touch sensitive device can improve the precision and control of the stylus. However, such a stylus can present demodulation challenges to the touch sensitive device due to the asynchronous interaction between the stylus and the device.

SUMMARY

A stylus signal detection and demodulation architecture that can facilitate synchronous demodulation on a touch input device is disclosed.

In one example, a plurality of stylus detectors can detect incoming stylus signals. An arbiter can determine the probable location of the stylus and can then direct the appropriate demodulation channels based on the detected position to a stylus controller that can synchronize the stylus frames as well as extract data contained within the stylus signal.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to the processing of stylus signals by a touch sensor panel. In one example, the touch panel can process the stylus signals by first detecting the stylus signal, determining where on a touch sensor panel the stylus is located, demodulating the stylus signal and extracting the data contained within the stylus signal.

Figure 1:
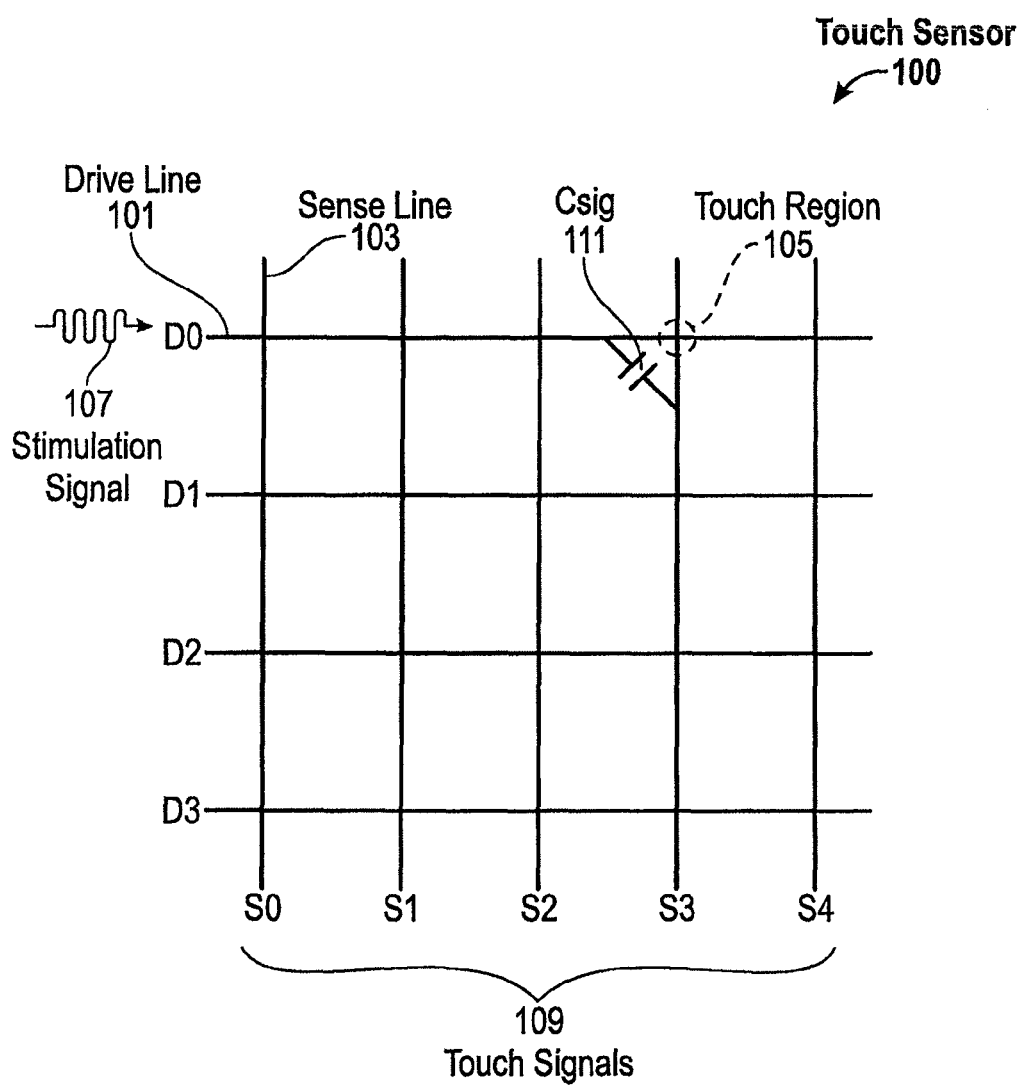
FIG. 1 illustrates an exemplary touch sensor that can be used with a touch sensitive device according to various examples.

FIG. 1 illustrates touch sensor 100 that can be used to detect touch events on a touch sensitive device, such as a mobile phone, tablet, touchpad, portable or desktop computer, portable media player, or the like. Touch sensor 100 can include an array of touch regions or nodes 105 that can be formed at the crossing points between rows of drive lines 101 (D0-D3) and columns of sense lines 103 (S0-S4), although it should be understood that the row/drive line and column/sense line associations are only exemplary. Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can receive touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a passive stylus, finger, etc., touches the touch sensor 100, the object can cause the capacitance Csig 111 to reduce by an amount ACsig at the touch location. This capacitance change ACsig can be caused by charge or current from the stimulated drive line 101 being shunted through the touching object to ground rather than being coupled to the crossing sense line 103 at the touch location. The touch signals 109 representative of the capacitance change ACsig can be received by the sense lines 103 to the sense circuitry for processing. The touch signals 109 can indicate the touch region where the touch occurred and the amount of touch that occurred at that touch region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

Figure 2:
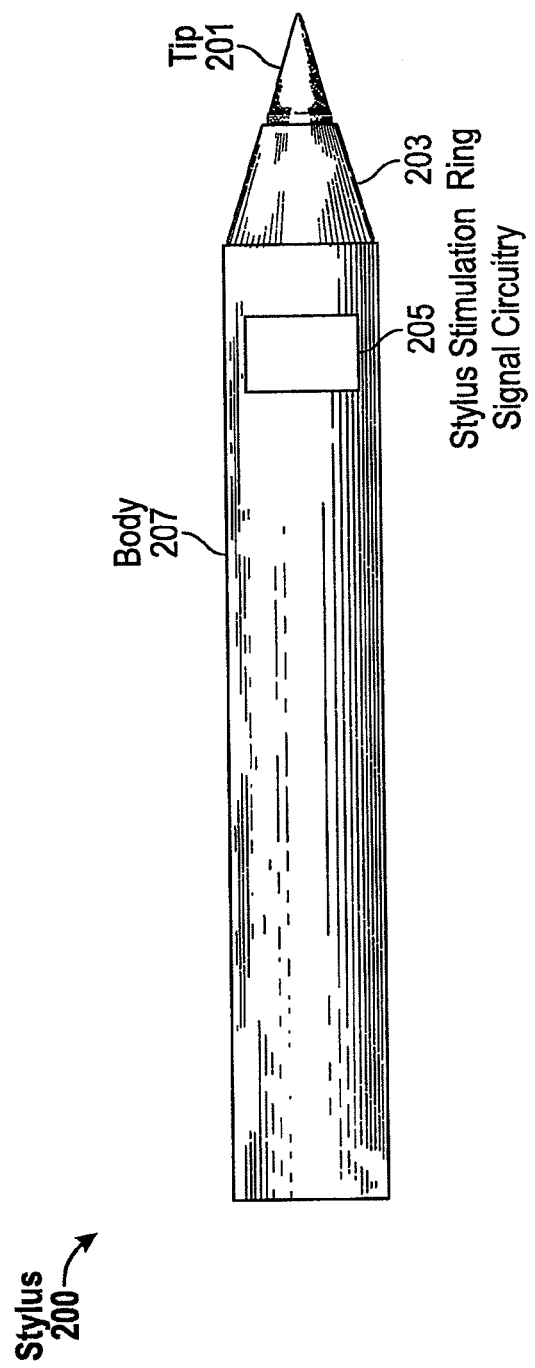
FIG. 2 illustrates a block diagram of an exemplary stylus according to various examples.

FIG. 2 illustrates a block diagram of an exemplary stylus 200 that can be used with a touch sensitive device, such as a mobile phone, touchpad, portable or desktop computer, or the like. Stylus 200 can generally include tip 201, ring 203, body 207, and multiple stylus stimulation signal circuitry 205 located within body 207. As will be described in greater detail below, stylus stimulation signal circuitry 205 can be used to generate a stimulation signal that can be transmitted to a touch sensitive device through tip 201. Tip 201 can include a material capable of transmitting the stylus stimulation signal from stylus stimulation signal circuitry 205 to the touch sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass or plastic) coated with a transparent (e.g., ITO) (if the tip is also used for projection purposes) or opaque material, or the like. In some examples, tip 201 can have a diameter of about 1.5 mm or less. Tip 201 which can be used to transmit stimulus signals from the stylus, can be implemented using a conductive ring 203. Ring 203 can include a conductive material, such as a flexible conductor, a metal, a conductor wrapped by a non-conductor, a non-conductor coated with a metal, a transparent conducting material (e.g., ITO), a transparent non-conductive material (e.g., glass) coated with a transparent material (e.g., ITO if the tip is used for projection purposes) or opaque material, or the like. Ring 203 can serve other purposes, such as providing an alternative means for transmitting the stylus stimulation signal from the stylus to the touch sensitive device. Similarly, tip 201 or ring 203 can also be used to sense the touch drive signal from the touch sensitive device. Both tip 201 and ring 203 can be segmented and each segment can be independently controlled according to the description above.

Figure 3:
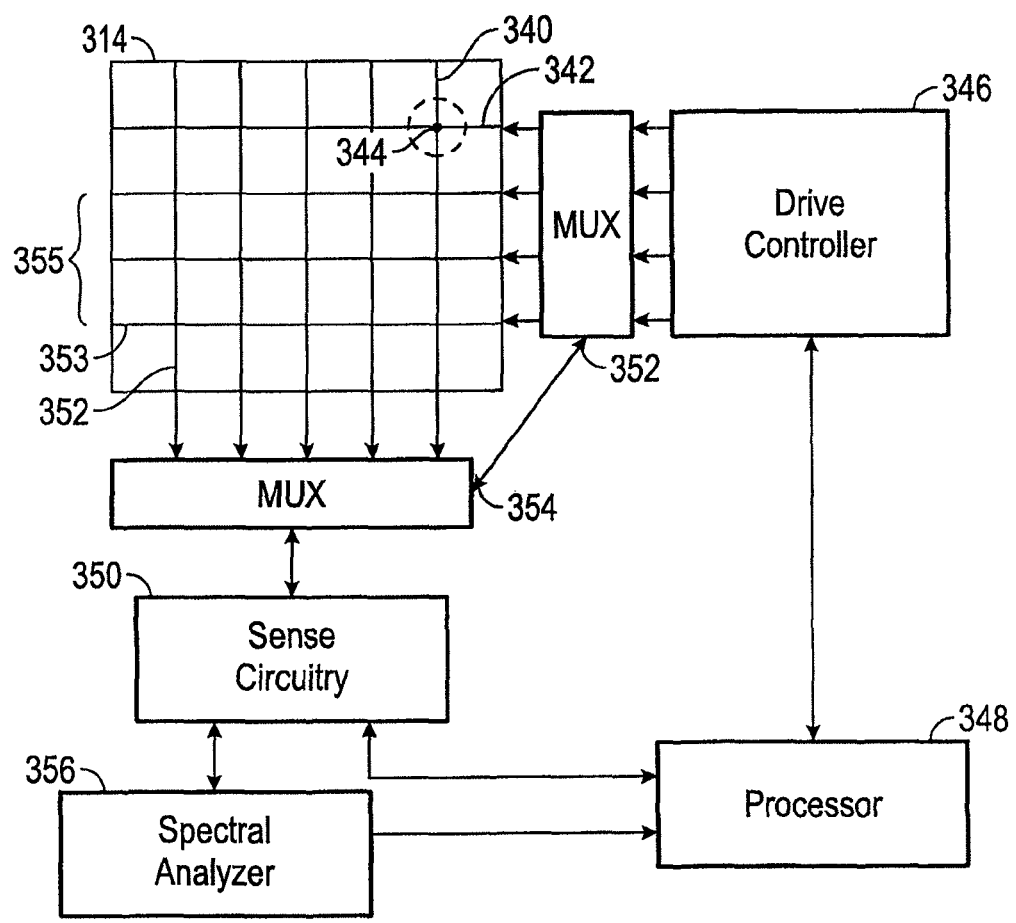
FIG. 3 illustrates a control system for a touch sensor that can detect both a user's touch and signals from a stylus according to disclosed examples.

FIG. 3 illustrates a control system for a touch sensor that can detect both a user's touch and signals from a stylus according to disclosed examples. The sensor panel 314 of the touch sensor may be configured to detect touches on the surface of the touch screen by changes in capacitance as described above in reference to FIG. 1. With reference to FIG. 3, a sensing node 344 formed by one or more electrodes (explained below) may form a first electrically conductive member and an object, such as a finger of the user, may form a second electrically conductive member. The sensor panel 314 of the touch screen may be configured in a self-capacitance arrangement or in a mutual capacitance arrangement.

In the self-capacitance arrangement, electrodes may include a single layer of a plurality of electrodes spaced in a grid or other arrangement where each electrode may form a node 344. The sensing circuit 350 can monitor changes in capacitance that may occur at each node 344. These changes typically occur at a node 344 when a user places an object (e.g., finger or tip 201 of the stylus 200) in close proximity to the electrode.

With continued reference to FIG. 3, in a mutual capacitance system, the electrodes may be separated into two layers forming drive lines 342 and sense lines 340. The drive lines 342 may be formed on a first layer and the sense lines 340 may be formed on a second layer. The nodes 344 for the sensor panel 314 may be defined at locations where the drive lines 342 may cross over or under the sense lines 340 (although they are typically placed in different layers). The sense lines 340 may intersect the drive lines 342 in a variety of manners. For example, in one example, the sense lines 340 are perpendicular to the drive lines 342, thus forming nodes 344 with x and y coordinates. However, other coordinate systems can also be used, and the coordinates of the nodes 344 may be differently defined.

A drive controller 346 can be connected to each of the drive lines 342. The drive controller 346 can provide a stimulation signal (e.g., voltage) to the drive lines 342. The sensing circuit 350 can be connected to each of the sense lines 340, and the sensing circuit 350 can act to detect changes in capacitance at the nodes 344 in the same manner as described in FIG. 1. During operation, the stimulation signal can be applied to the drive lines 342, and due to the capacitive coupling between the drive lines 342 and sense lines 340, a current can be carried through to the sense lines 340 at each of the nodes 344. The sensing circuit 350 can then monitor changes in capacitance at each of the nodes 344. In some examples, each drive line can be switchably configured to operate as sense lines, and thus a sensing circuit and multiplexer similar to 350 and 354 can be connected to the drive lines similar to the sense lines depicted in FIG. 3.

In either the self-capacitance or mutual capacitance arrangements discussed above, the sensing circuit 350 can detect changes in capacitance at each node 344. This may allow the sensing circuit 350 to determine when and where a user has touched various surfaces of the touch screen 306 with one or more objects. The sensing circuit 350 may include one more sensors for each of the sense lines 340 and may then communicate data to a processor 348. In one example, the sensing circuit 350 may convert the analog capacitive signals to digital data and then transmit the digital data to the processor 348. In other examples, the sensing circuit 350 may transmit the analog capacitance signals to the processor 348, which may then convert the data to a digital form. Further, it should be noted that the sensing circuit 350 may include individual sensors for each sensing line 342 or a single sensor for all of the sense lines 340. The sensing circuit 350 may report a location of the node 344, as well as the intensity of the capacitance (or changed thereof) at the node 344.

In some examples, the touch screen may include one or more multiplexers. For example, during touch operation, the sensing circuit 350 may also include a multiplexer configured to perform time multiplexing for the sense lines 340. For example, the sensing circuit 350 may receive signals from each of the nodes 344 along the sense lines 340 at approximately the same time. The multiplexer can store the incoming signals and then may release the signals sequentially to the processor 348 one at a time or in subsets. As discussed above, in some examples that are not pictured, the drive lines can be configured to also act as sense lines and thus can be configured with multiplexers and sense circuitry similar to the sense lines as described above.

In addition to the multiplexers that may be used to during a touch mode to process touch signals, the touch screen may also include a drive multiplexer 352 and/or a sense multiplexer 354. These two input device multiplexers 352, 354 may be in communication with the respective set of lines 342, 344 to switch between a touch mode and a stylus or input device mode. As will be discussed in more detail below, during a stylus mode, in which the sensing circuit 350 is configured to detect input from a stylus or other input device, the touch screen may selectively scan the sense lines 340, as well as the drive lines 342, in order to receive data transmitted from the tip 202 of the stylus 200. In these examples, the drive controller 346 may further be configured to sense for signals on the drive lines 342 in order to detect a signal transmitted from the tip 202 of the stylus 200. In this manner, the drive lines 342 may be configured to act as sense lines 340 and interact with the tip 202 of the stylus 200 to receive one or more signals (e.g., voltage signals). In other words, rather than providing a stimulation signal to the drive lines 342, during a stylus scan, if the stylus is transmitting, the stylus may apply a stimulation signal to the drive lines 342 (in the form of a data transmission signal).

In some examples, the drive lines 342 may be scanned after the input device has been detected by the sense lines. These examples may reduce the scanning time required for the touch screen to detect the input device, as the drive lines 342 may only be scanned in instances where the input device is actually present. Thus, if the input device is not detected, the touch screen may more quickly return to scanning for touch inputs. That said, it should be noted that when driving, the stylus 200 may provide a stimulation signal to both the sense and drive lines simultaneously and so in some instances both lines may be scanned simultaneously. However, in some examples, the sense lines 340 and drive lines 342 may be scanned and demodulated sequentially (when the input device is detected), as this type of scanning may allow the touch screen to re-use the same touch hardware for both scanning and drive line scanning. That is, the sense circuitry may be multiplexed to the drive lines, to reduce the separate components that may be, required by the touch screen. The control system of FIG. 3 can also include a spectral analyzer for finding frequencies that have minimal noise.

Additionally, in some examples, the touch controller, such as the sense circuitry 350 and/or drive controller, may analyze the input or stimulation signal transmitted from the input device in order to detect the position of the input device, as well as to receive data communication. In other words, the input signal may be used to detect location, and the same signal may be encoded with data from the input device.

Figure 4:
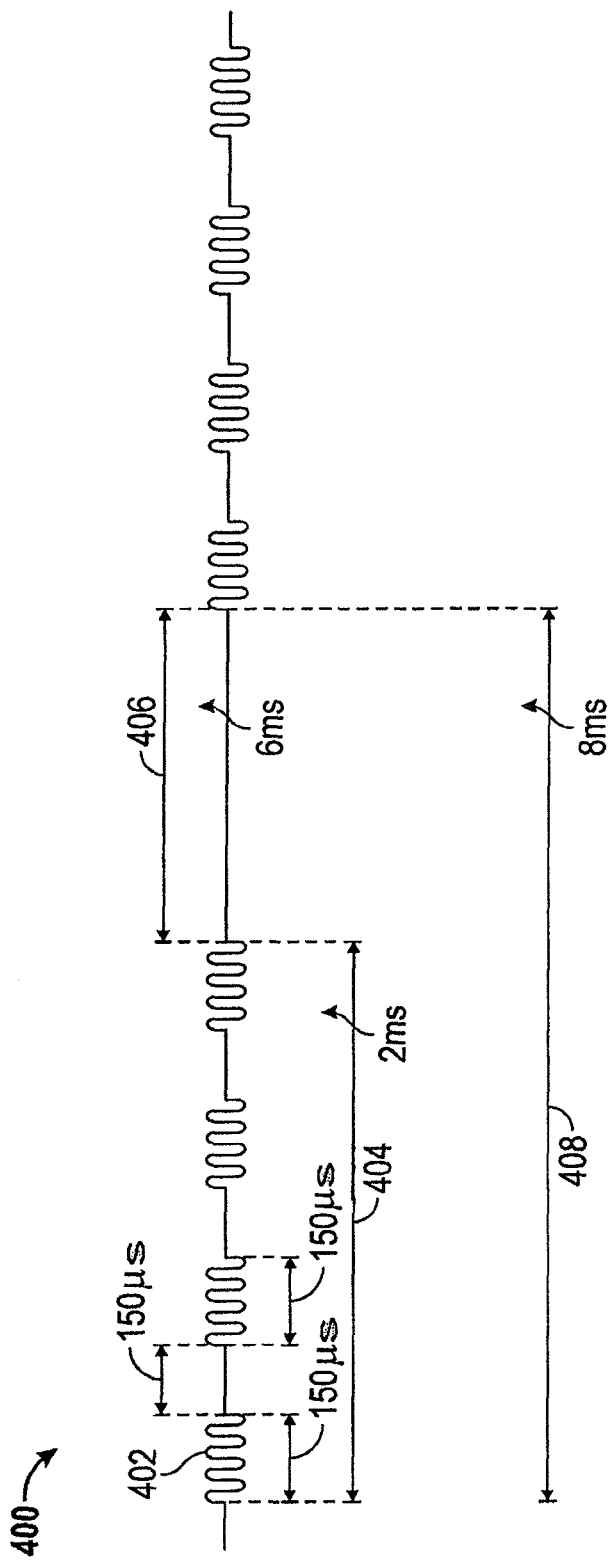
FIG. 4 illustrates an example stylus signal waveform according to examples of the disclosure.

FIG. 4 illustrates an example stylus signal waveform according to examples of the disclosure. In this example, stylus signal 400 can contain multiple steps 402. Each step can be of a pre-determined time period; in the example of FIG. 4 the time period can be 150 μs. During the step, a sinusoidal signal at a given frequency can be transmitted as the signal. During the time periods in between steps, no signal at the same frequency can be transmitted by the stylus. A grouping of steps can be called a burst. As illustrated, a group of four steps can be called a burst 404. If each step 402 can be 150 μs and each gap between steps can be 150 μs, then each burst can be approximately 2 ms. The time between bursts can also be pre-determined. In the example of FIG. 4, the time between burst 406 can be 6 ms in duration. In other words, between the last step of burst 404 and the next burst, there can be 6 ms where no signal is transmitted.

Figure 5:
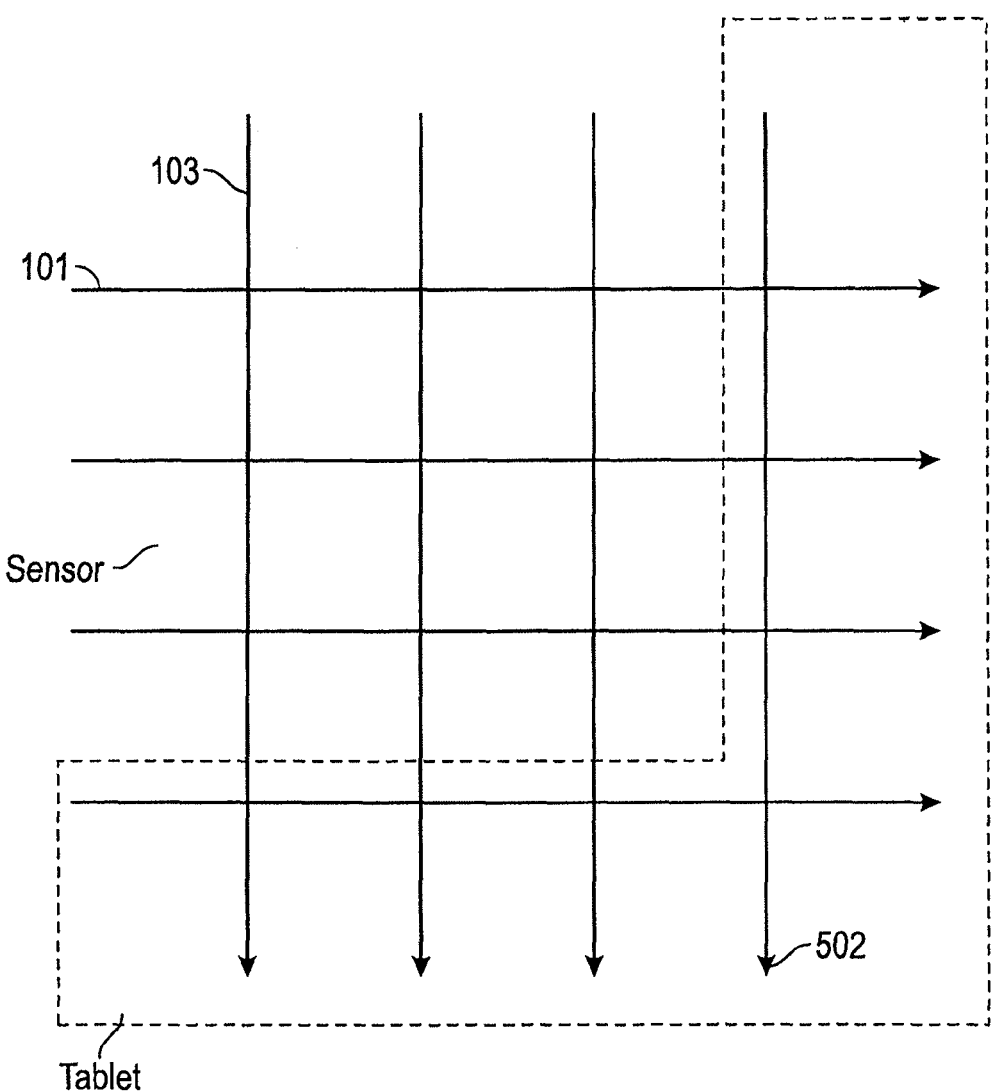
FIG. 5 illustrates an example touch/stylus demodulation circuit according to examples of the disclosure.

FIG. 5 illustrates an example stylus receiver circuit according to examples of the disclosure. As described above, during a touch operation, the drive lines 101 can transmit a stimulation signal that can be received via the sense lines 103 due to mutual capacitance between the drive lines and sense lines. As illustrated in FIG. 5, when the device is in a stylus searching mode or stylus active mode (described in further detail below), the drive lines 101 and the sense lines 103 can be configured to receive stylus signals. Each electrode of the drive and sense electrodes 101 and 103 can be coupled to a receiver 502. As described above in a touch sensing mode, the drive lines can be coupled to signal generators that generate a stimulation signal, and the sense lines can be coupled to receivers in order to receive signals indicative of a touch occurring on the touch sensor panel. In a stylus searching mode or a stylus active mode, both the drive lines 101 and sense lines 103 can be coupled to receivers 502 in order receive signals generated by the stylus. Thus, on a touch sensor panel that has, for example, 40 rows and 30 columns, there can be 70 total stylus receive channels. On the columns/sense lines 103, the receive circuitry can be used for both touch and stylus. On the rows/drive lines 101, the electrodes can be switchably configured to be coupled to drive lines during a touch sensing operation and receivers during a stylus sensing operation.

Figure 6:
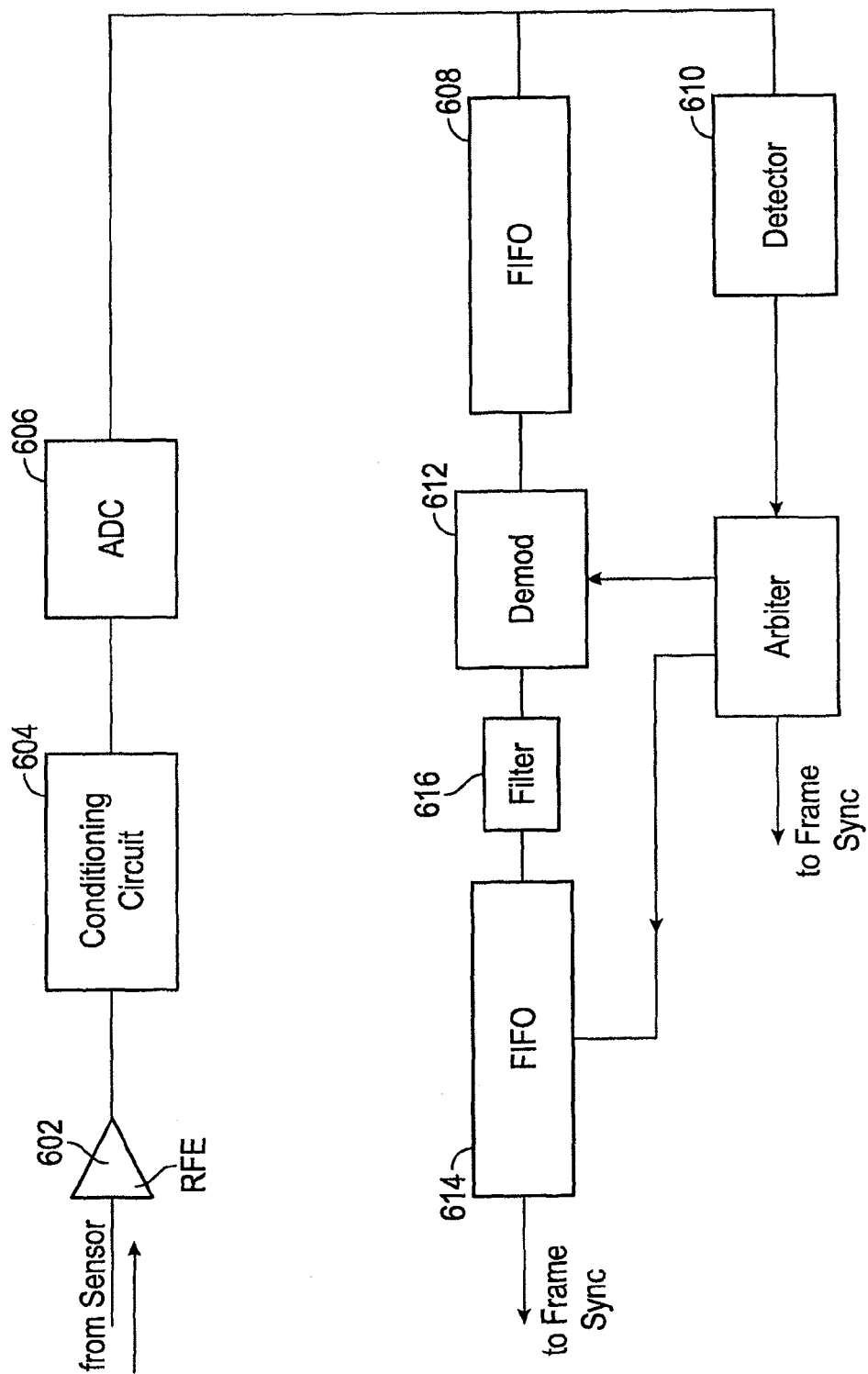
FIG. 6 illustrates a stylus signal receiver according to examples of the disclosure.

FIG. 6 illustrates a stylus signal receiver according to examples of the disclosure. A drive line 101 or sense line 103, which in a stylus detection mode become electrodes, act as inputs to a receiver front end (RFE) 602. RFE 602 can provide any analog signal processing needs, including, for example: amplification, filtering, attenuation, etc. The output of RFE 602 can be sent to conditioning circuit 604. Conditioning circuit 604 can condition the signal to be digitized by analog-to-digital converter 606 by providing filtering, buffering etc. At ADC 606, the analog signal can be converted to digital samples; the output of the ADC can then be fed into first-in-first-out buffer 608 and stylus detector 610. Stylus detector 610 can perform a single frequency windowed discrete Fourier transform of the signal, with the window sliding as a function of time, in order to detect peak energy within the window. The peak can be indicative of the end time of stylus signal. A more detailed discussion of the stylus detector can found in U.S. patent application Ser. No. 13/830,399 entitled "Stylus Signal Detection and Demodulation Architecture" incorporated in its entirety herein for all purposes.

The detector 610 can determine the end and beginning times of a detected stylus step. This information can be sent to an arbiter 802 (described below) and can also be sent to a burst FIFO 614 as well as a demodulator 612. Demodulator 612 can take, as its input, the output of FIFO 608. The demodulator 612 can thus receive a delayed version of the signal being output by ADC 606. When the demodulator 612 receives the start time and end time of a detected stylus signal, it can coordinate demodulation of the signal with the output of the FIFO such that demodulation occurs only during the detected beginning and end of the stylus signal. In other words, while the detector receives the stylus signal in real time, the demodulator will get a delayed version of the signal, with delay time being adequate enough to allow the detector to report to the demodulator the beginning and end time of the stylus signal. By the time the stylus signal exits the FIFO 608, the demodulator can know when to act on the signal in order to demodulate it. The output of the demodulator 612 can then be inputted into burst FIFO 614. The arbiter 802 can relay the start time and end time of the stylus step signal to the burst FIFO 614. Burst FIFO 614 can feed the appropriate data that occurred during the time period between the estimated start and stop time of the stylus step to a frame synchronizer (discussed below).

Figure 7:
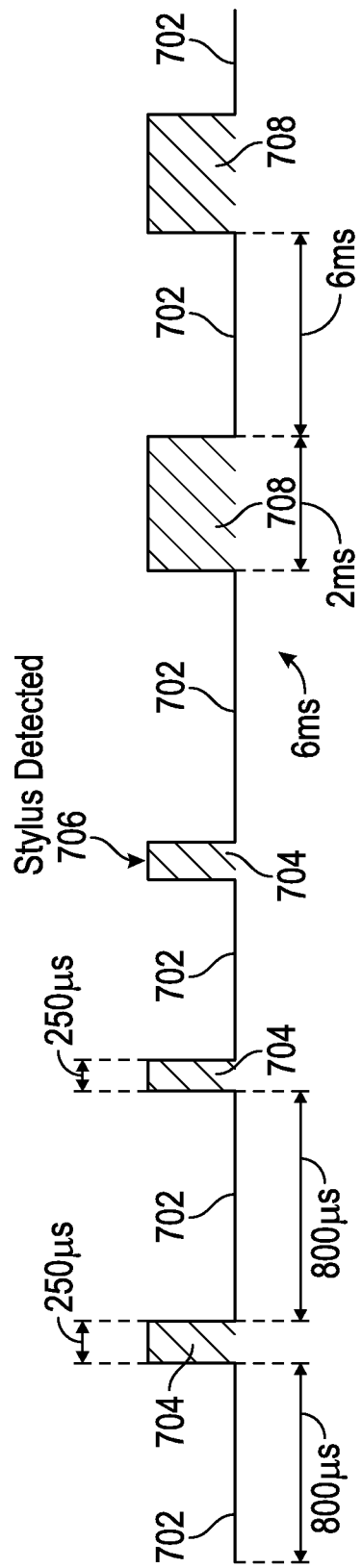
FIG. 7 illustrates an example of a touch and stylus sensing timing arrangement according to examples of the disclosure.

Since the drive lines can switch their configurations depending on whether the device is detecting touch or detecting stylus signals, the operation of the device in a touch detection mode and stylus detection mode can be time multiplexed in order to allow the device to perform both touch and stylus operations. FIG. 7 illustrates an example of a touch and stylus sensing timing arrangement according to examples of the disclosure. As time progresses from left to right in the timing diagram of FIG. 7, the device can switch between touch detection mode 702 and various stylus detection modes. In this example, touch mode 702 can alternate with stylus detection mode 704. During the period of time where touch mode 702 is alternating with stylus detection mode, the touch mode can be 800 μs in duration while stylus mode can be 250 μs.

During stylus detection mode, the device can be actively searching for a stylus signal as described above, and if no stylus signal is found during the period of time allotted to stylus detection mode 704, the device can return to touch detection mode 702. However if a stylus signal is detected during stylus detection mode 704, the timing between touch detection and the stylus modes can be altered. For instance, in the example of FIG. 7, if a stylus is detected at time 706 during a stylus detection mode 704, the device can shift into a stylus active mode. During stylus active mode, the device can detect the location of stylus signals and demodulate any incoming stylus signals, the same as stylus detection mode 704; however, the timing can be synchronized with the burst/step patterns described in FIG. 4. For instance, when a stylus is first detected at time 706, the beginning of the next touch detection mode 702 can be synchronized with the time between stylus bursts 406, which in the example of FIG. 4 is 6 ms. Thus, as illustrated in FIG. 7 when the stylus is detected at time 706, the next touch detection mode 702 can last for 6 ms while the stylus is between bursts. The stylus detection modes that come after can be approximately 2 ms, which can correspond to the time required by the stylus to transmit a burst. In this way, the touch detection mode can be timed to occur between bursts when the stylus is not generating a signal, and the stylus active mode can correspond to a period of time when a stylus burst is expected to arrive on the device. If the device does not detect a stylus during a pre-determined number of stylus active mode time periods 708, the device can return to the timing scheme illustrated at the beginning of the timing diagram and alternate touch and stylus in 800 μs and 250 is time periods, respectively.

Figure 8:
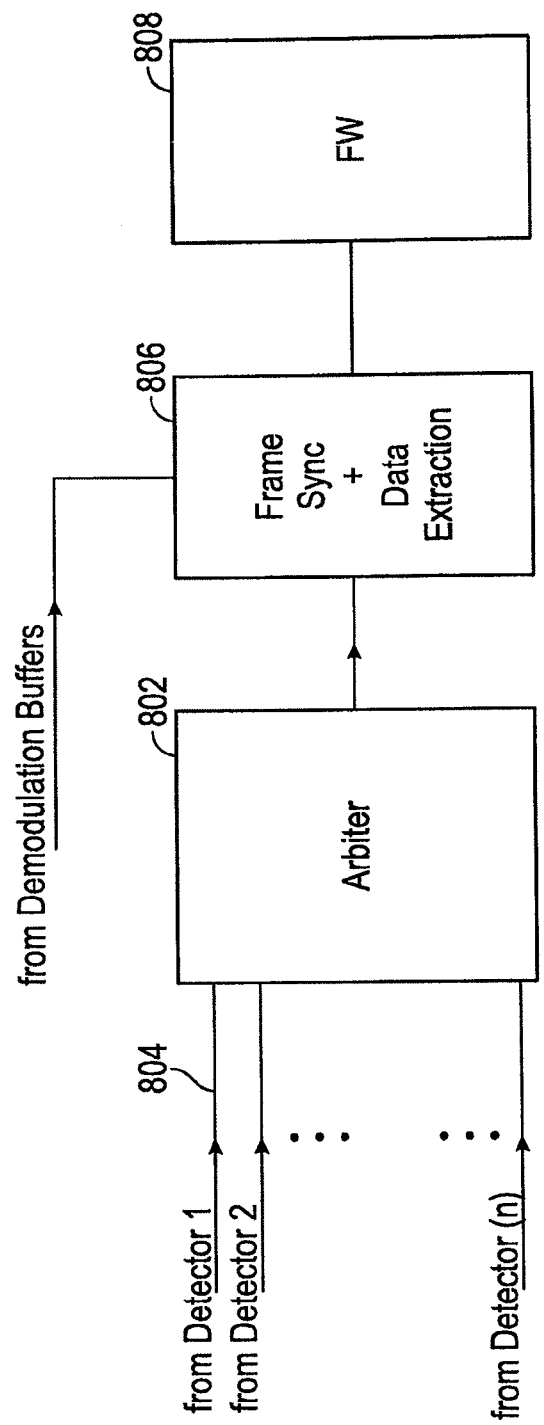
FIG. 8 illustrates an exemplary stylus detection and demodulation device according to examples of the disclosure.

FIG. 8 illustrates an exemplary stylus detection and demodulation device according to examples of the disclosure. As illustrated in FIG. 8, the output of each individual detector corresponding to a stylus signal channel can be inputted into arbiter 802. Each detector 804 can relay information to the arbiter 802 about the stylus signals it has detected. For instance, each detector can relay information regarding whether or not a stylus signal was detected on that detector; if a stylus signal was detected it can relay to the arbiter the estimated beginning and end times of an estimated step, and it can also relay metrics about the detected signal. Metrics can include information related to the strength of the signal detected by the detectors, for instance the magnitude of detected stylus signal, the number of zero-crossings detected, or the number of crossings of a pre-determined non-zero threshold. By relaying a metric about the detection, each detector can alert the arbiter as to the level of fidelity of the detection.

The arbiter can scan the information relayed by each detector to determine the detector most likely to have the most accurate measurement of the beginning and end time of the stylus step. When the arbiter determines the "winning" detector, it can output a signal to all stylus signal receive channels like those depicted in FIG. 6. The signal sent by the arbiter of the device can tell each receive channel the estimated start and start time of the stylus step. Referring to FIG. 6, each the arbiter signal can be received by FIFO 614. FIFO 614 can extract the data corresponding to the estimated start and stop time received from the arbiter 802 and send it to Frame Sync Module 806.

Frame Sync module 806 can receive data from each burst FIFO 614 of each stylus detection receive channel. Frame Sync module 806 can create frames of data, each frame of data corresponding to a given scan of the channels. When one frame of data is acquired, another frame can be created that corresponds to another scan of the stylus signal receive channels. The frame sync module 806 can time the beginning of the next frame of data to correspond with an individual detected burst. In this way, the data frames are synchronized to the stylus signals being generated by the stylus after each individual burst. By synching the stylus signals being generated to the device after every burst, any clock drift associated with differing phases between the device and the stylus can be mitigated. This module could be implemented in firmware or hardware.

The frame sync module can also perform data extraction. In other words, the data that is encoded within a stylus signal can be decoded. In one example, data can be encoded into the stylus signal by modulating the phase difference between successive steps of a stylus burst. Referring to FIG. 4, step 402 can have a given phase. The next step of the burst can have another phase value. The difference in phases between the first step and the any step can be used to encode data using a standard differential phase shift keying (DPSK) technique and can be demodulated by using standard DPSK demodulation techniques. While DPSK is given as an example, the disclosure is not so limited and data can be encoded in numerous ways such as frequency shift keying (FSK), amplitude shift keying (ASK), quadrature amplitude modulating (QAM) and other various modulation and demodulation techniques known to one of skill in the art.

Once the data is decoded, the frame sync module can send the frames to firmware to determine the position of the stylus by analyzing each received frame of data and finding the channels with the highest magnitude signal in the rows (X direction) and the channels with the highest magnitude in the columns (Y-direction) and performing a centroid operation on each axis.

Figure 9:
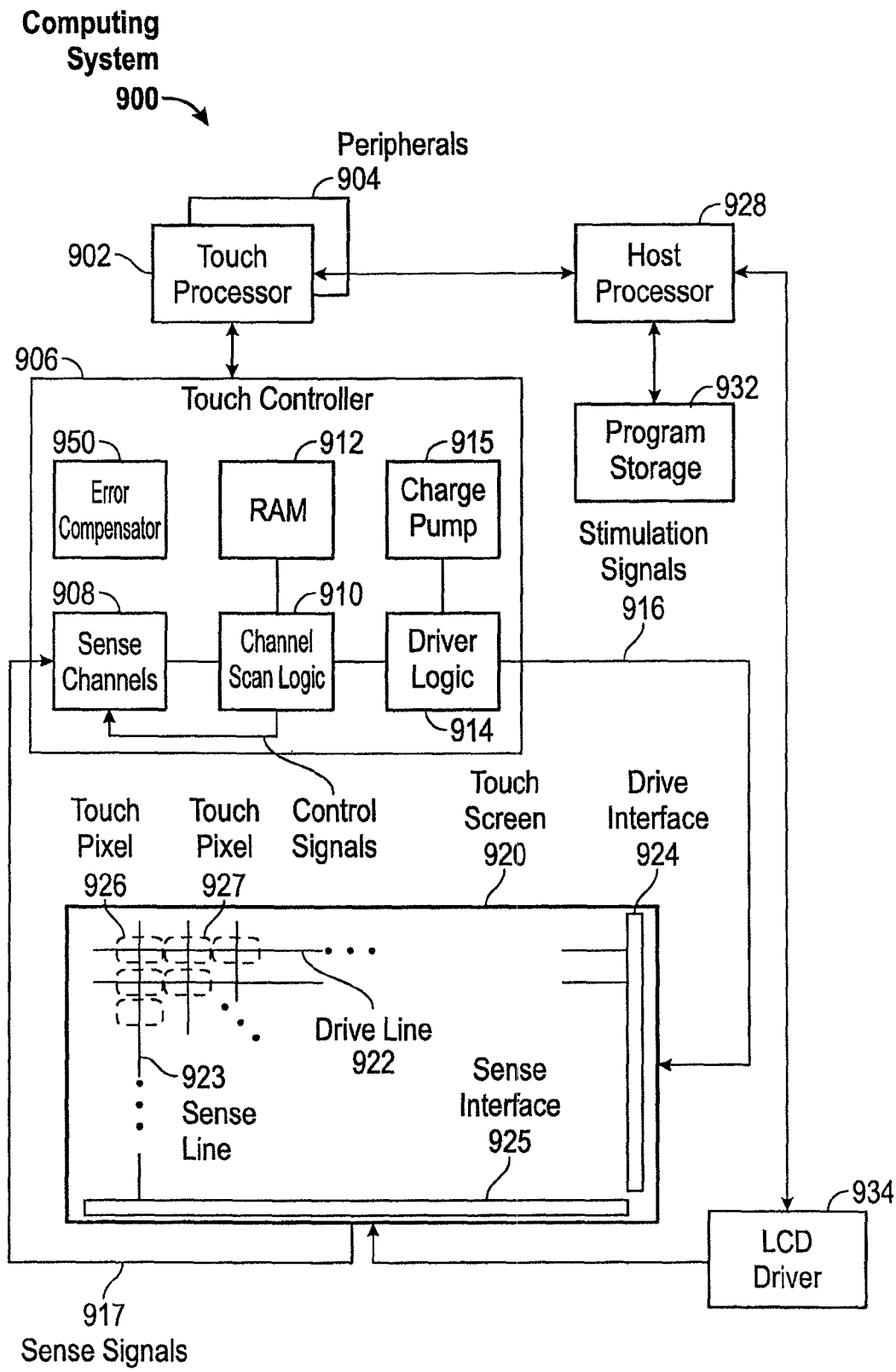
FIG. 9 is a block diagram of an example computing system that illustrates one implementation of a touch sensor panel display with stylus signal noise correction according to examples of the disclosure.

FIG. 9 is a block diagram of an example computing system that illustrates one implementation of a touch sensor panel display with stylus detection and demodulation according to examples of the disclosure. Computing system 900 could be included in, for example, mobile telephone 136, digital media player 140, personal computer 144, or any mobile or non-mobile computing device that includes a touch screen. Computing system 900 can include a touch sensing system including one or more touch processors 902, peripherals 904, a touch controller 906, and touch sensing circuitry. Peripherals 904 can include, but are not limited to, random access memory (RAM) or other types of memory or storage, watchdog timers and the like. Touch controller 906 can include, but is not limited to, one or more sense channels 909, channel scan logic 910 and driver logic 914. Channel scan logic 910 can access RAM 912, autonomously read data from the sense channels and provide control for the sense channels. In addition, channel scan logic 910 can control driver logic 914 to generate stimulation signals 916 at various frequencies and phases that can be selectively applied to drive regions of the touch sensing circuitry of touch screen 920, as described in more detail below. In some examples, touch controller 906, touch processor 102 and peripherals 904 can be integrated into a single application specific integrated circuit (ASIC).

Computing system 900 can also include a host processor 929 for receiving outputs from touch processor 902 and performing actions based on the outputs. For example, host processor 929 can be connected to program storage 932 and a display controller, such as an LCD driver 934. Host processor 929 can use LCD driver 934 to generate an image on touch screen 920, such as an image of a user interface (UI), and can use touch processor 902 and touch controller 906 to detect a touch on or near touch screen 920, such a touch input to the displayed UI. The touch input can be used by computer programs stored in program storage 932 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 929 can also perform additional functions that may not be related to touch processing.

Integrated display and touch screen 920 can include touch sensing circuitry that can include a capacitive sensing medium having a plurality of drive lines 922 and a plurality of sense lines 923. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 922 can be driven by stimulation signals 916 from driver logic 914 through a drive interface 924, and resulting sense signals 917 generated in sense lines 923 can be transmitted through a sense interface 925 to sense channels 909 (also referred to as an event detection and demodulation circuit) in touch controller 906. In this way, drive lines and sense lines can be part of the touch sensing circuitry that can interact to form capacitive sensing nodes, which can be thought of as touch picture elements (touch pixels), such as touch pixels 926 and 927. This way of understanding can be particularly useful when touch screen 920 is viewed as capturing an "image" of touch. In other words, after touch controller 906 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 10:
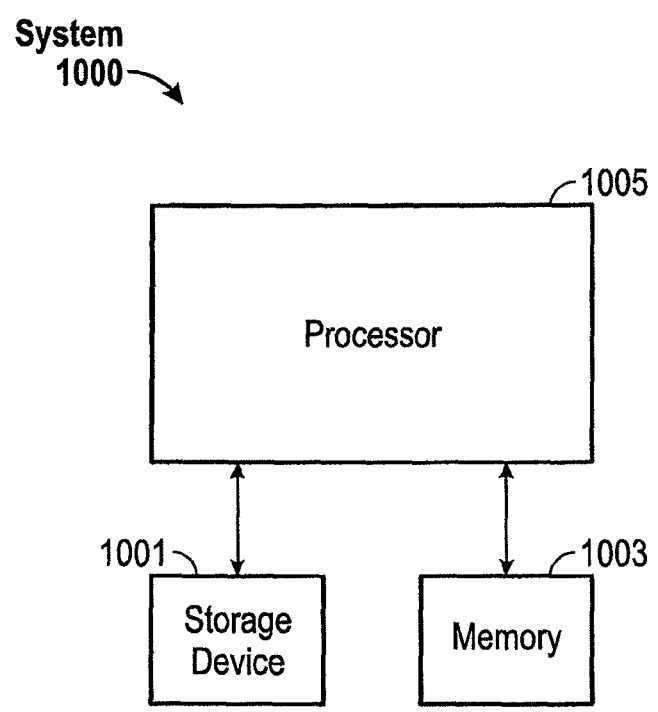
FIG. 10 illustrates an exemplary system for generating or processing a stylus stimulation signal according to examples of the disclosure.

One or more of the functions relating to stylus detection and demodulation described above can be performed by a system similar or identical to system 1000 shown in FIG. 10. System 1000 can include instructions stored in a non-transitory computer readable storage medium, such as memory 1003 or storage device 1001, and executed by processor 1005. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 10, but can include other or additional components in multiple configurations according to various examples. Additionally, the components of system 1000 can be included within a single device, or can be distributed between multiple devices.

Figure 11A:
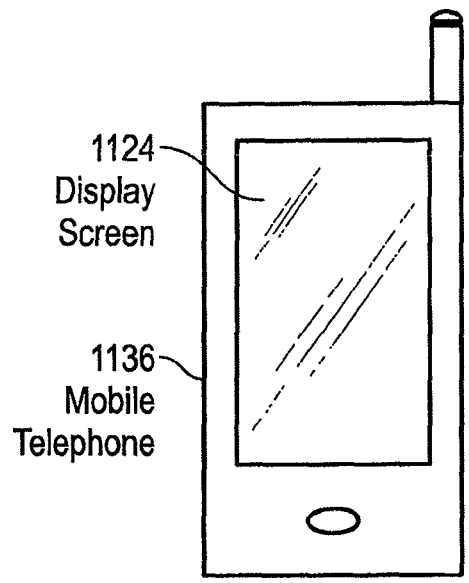
FIG. 11a-d illustrate exemplary personal devices that include a touch sensor according to various examples.
Figure 11B:
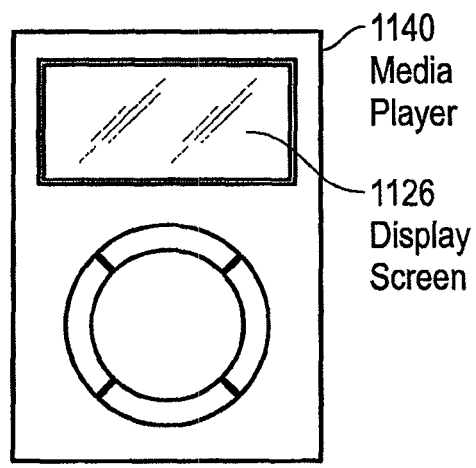
Figure 11C:
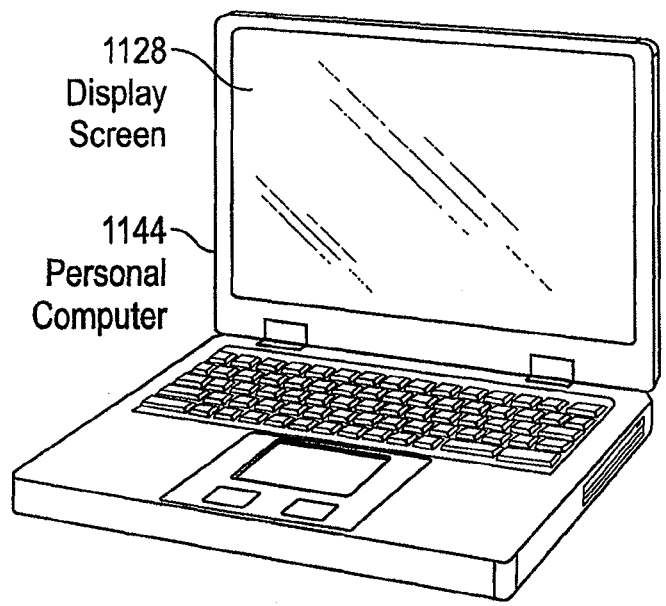
Figure 11D:
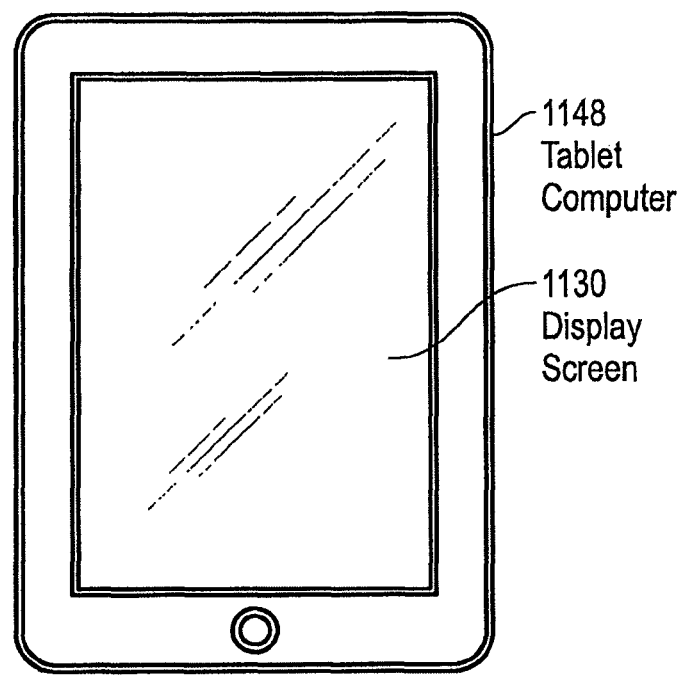

FIGS. 11A-11D show example systems in which touch sensor panels according to examples of the disclosure may be implemented. FIG. 11A illustrates an example mobile telephone 1136 that includes a touch sensor panel 1124. FIG. 11B illustrates an example digital media player 1140 that includes a touch sensor panel 1126. FIG. 11C illustrates an example personal computer 1144 that includes a touch sensor panel 1128. FIG. 11D illustrates an example tablet computing device 1148 that includes a touch sensor panel 1130.

Therefore, according to the above, some examples of the disclosure are directed to a method of detecting stylus signals generated by an external stylus on a touch input device, the method comprising configuring the touch input device to receive a stylus signal, receiving the stylus signal at a plurality of stylus signal detectors, determining which of the plurality of stylus signal detectors has a greatest likelihood of having received the stylus signal, and demodulating the received stylus signal based on one or more metrics generated by the determined stylus signal detector. Additionally or alternatively to one or more of the examples disclosed above, in some examples, configuring the touch input device to receive a stylus signal includes configuring a plurality of drive lines and a plurality of sense lines configured for receiving touch inputs to additionally receive a stylus signal. Additionally or alternatively to one or more of the examples disclosed above, in some examples, configuring the plurality of sense lines to receive a stylus signal includes coupling each sense line of the plurality of sense lines to a stylus signal detector. Additionally or alternatively to one or more of the examples disclosed above, in some examples, the one or more metrics can include an estimated start time of the detected stylus signal, an estimated end time of the stylus signal, and an estimated signal strength of the detected stylus signal. Additionally or alternatively to one or more of the examples disclosed above, in some examples, determining which of the plurality of stylus signal detectors has the greatest likelihood of having received the stylus signal includes comparing the estimated signal strengths of the plurality of detectors and determining which detector of the plurality of detectors has the greatest estimated signal strength. Additionally or alternatively to one or more of the examples disclosed above, in some examples, demodulating the received stylus signal based on the one or more metrics generated by the determined stylus detector includes using the estimated start time of the detected stylus signal and the estimated end time of the stylus signal to facilitate a windowed demodulation of the stylus signal. Additionally or alternatively to one or more of the examples disclosed above, in some examples, the method further comprises organizing the demodulated stylus signal into a frame of data, wherein the frame of data is synchronized in time to the generation of the stylus signal by an external stylus. Additionally or alternatively to one or more of the examples disclosed above, in some examples, the method further comprises extracting a plurality of data from the demodulated stylus signal.

Some examples of the disclosure are directed to an apparatus for detecting stylus signals generated by an external stylus on a touch input device, the apparatus comprising a plurality of electrodes capable of operating as touch hardware during a touch operation mode and operating as stylus detection hardware during a stylus detection mode, a plurality of stylus signal detectors coupled to the plurality of electrodes during a stylus detection mode, each stylus detector capable of receiving a stylus signal and generating one or more metrics pertaining to the detected stylus signal, an arbiter capable of determining which of the plurality of stylus signal detectors has the greatest likelihood of having received the stylus signal, and a demodulator configured to demodulate the stylus signal based on the one or more metrics generated by the stylus detector determined to have the greatest likelihood of having received the stylus signal. Additionally or alternatively to one or more of the examples disclosed above, in some examples, the apparatus further includes a processor capable of configuring the input device to alternate between a touch detection mode and a stylus detection mode, wherein configuring the input device to operate in a stylus detection mode includes configuring a plurality of drive lines and a plurality of sense lines configured to receive a touch input to receive a stylus signal. Additionally or alternatively to one or more of the examples disclosed above, in some examples, the apparatus further comprises switching hardware configured to couple each sense line of the plurality of sense lines to a stylus signal detector. Additionally or alternatively to one or more of the examples disclosed above, in some examples, the one or more metrics generated by the plurality of stylus detectors can include an estimated start time of the detected stylus signal, an estimated end time of the stylus signal, and an estimated signal strength of the detected stylus signal. Additionally or alternatively to one or more of the examples disclosed above, in some examples, the arbiter determines which of the plurality of detectors has the greatest likelihood of having received the stylus signal by comparing the estimated signal strengths of the plurality of detectors and determining which detector of the plurality of detectors has the greatest estimated signal strength. Additionally or alternatively to one or more of the examples disclosed above, in some examples, the demodulator can use the estimated start time of the detected stylus signal and the estimated end time of the stylus signal to facilitate a windowed demodulation of the stylus signal. Additionally or alternatively to one or more of the examples disclosed above, in some examples, the apparatus further comprises a frame synchronizer configured to organize the demodulated stylus signal into a frame of data, wherein the frame of data is synchronized in time to the generation of the stylus signal by an external stylus. Additionally or alternatively to one or more of the examples disclosed above, in some examples, the apparatus further comprises a data extraction unit configured to extract a plurality of data from the demodulated stylus signal.

Some examples of the disclosure are directed to a non-transitory computer readable storage medium having stored thereon a set of instructions for detecting a demodulating a stylus signal generated by an external stylus, that when executed by a processor causes the processor to configure the touch input device to receive a stylus signal, receive the stylus signal on the touch sensor panel, determine which of the plurality of detectors has the greatest likelihood of having received the stylus signal, and demodulate the received stylus signal based on one or more metrics generated by the stylus detector determined to have the greatest likelihood of having received the stylus signal. Additionally or alternatively to one or more of the examples disclosed above, in some examples, configuring the touch input device to receive a stylus signal includes configuring a plurality of drive lines and a plurality of sense lines configured for receiving touch inputs to additionally receive a stylus signal. Additionally or alternatively to one or more of the examples disclosed above, in some examples, configuring the plurality of sense lines to receive a stylus signal includes coupling each sense line of the plurality of sense lines to a stylus signal detector. Additionally or alternatively to one or more of the examples disclosed above, in some examples, the one or more metrics can include an estimated start time of the detected stylus signal, an estimated end time of the stylus signal, and an estimated signal strength of the detected stylus signal. Additionally or alternatively to one or more of the examples disclosed above, in some examples, determining which of the plurality of stylus signal detectors has the greatest likelihood of having received the stylus signal includes comparing the estimated signal strengths of the plurality of detectors and determining which detector of the plurality of detectors has the greatest estimated signal strength. Additionally or alternatively to one or more of the examples disclosed above, in some examples, demodulating the received stylus signal based on the one or more metrics generated by the determined stylus detector includes using the estimated start time of the detected stylus signal and the estimated end time of the stylus signal to facilitate a windowed demodulation of the stylus signal. Additionally or alternatively to one or more of the examples disclosed above, in some examples, the processor is further caused to organize the demodulated stylus signal into a frame of data, wherein the frame of data is synchronized in time to the generation of the stylus signal by an external stylus. Additionally or alternatively to one or more of the examples disclosed above, in some examples, the processor is further caused to extract a plurality of data from the demodulated signal.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method of detecting stylus signals generated by an asynchronous stylus on a touch input device, the method comprising:
    configuring the touch input device to receive a stylus signal, the stylus signal generated by the asynchronous stylus, wherein the asynchronous stylus generates the stylus signal asynchronously from the touch input device, and the stylus signal generated by the asynchronous stylus has a start time and an end time;
    receiving the stylus signal at a plurality of stylus signal detectors, each of the plurality of stylus signal detectors corresponding to one of a plurality of sense channels of the touch input device;
    generating one or more metrics at the plurality of stylus signal detectors pertaining to the received stylus signal, the metrics comprising a first time corresponding to an estimated start time of the received stylus signal and a second time corresponding to an estimated end time of the stylus signal transmission;
    determining which of the plurality of stylus signal detectors has a greatest likelihood of having received the stylus signal based on the one or more metrics; and
    demodulating the received stylus signal, at a plurality of demodulators, each of the plurality of demodulators corresponding to one of the plurality of sense channels of the input device, based on the first time and the second time from the stylus signal detector determined to have the greatest likelihood of having received the stylus signal.

2. The method of claim 1, wherein configuring the touch input device to receive the stylus signal includes configuring a plurality of drive lines and a plurality of sense lines configured for receiving touch inputs to additionally receive the stylus signal.

3. The method of claim 2, wherein configuring the plurality of sense lines to receive the stylus signal includes coupling each sense line of the plurality of sense lines to a stylus signal detector of the plurality of stylus signal detectors.

4. The method of claim 1, wherein the one or more metrics can include an estimated signal strength of the received stylus signal.

5. The method of claim 4, wherein determining which of the plurality of stylus signal detectors has the greatest likelihood of having received the stylus signal includes comparing the estimated signal strengths of the plurality of detectors and determining which detector of the plurality of detectors has the greatest estimated signal strength.

6. The method of claim 1, wherein demodulating the received stylus signal based on the first time and the second time from the stylus detector determined to have the greatest likelihood of having received the stylus signal includes using the first time and the second time to facilitate a windowed demodulation of the received stylus signal.

7. The method of claim 1, further comprising organizing the demodulated stylus signal into a frame of data, wherein the frame of data is synchronized in time to the generation of the stylus signal by the asynchronous stylus using the first time and the second time from the stylus signal detector determined to have the greatest likelihood of having received the stylus signal.

8. The method of claim 1, further comprising extracting a plurality of data from the demodulated stylus signal.

9. An apparatus for detecting stylus signals generated by an asynchronous stylus on a touch input device, the apparatus comprising:
    a plurality of electrodes capable of operating as touch detection hardware during a touch operation mode and operating as stylus detection hardware during a stylus detection mode;
    a plurality of stylus signal detectors coupled to the plurality of electrodes during a stylus detection mode, each of the plurality of stylus signal detectors corresponding to one of a plurality of sense channels of the touch input device, each of the plurality of stylus signal detectors capable of receiving a stylus signal, the stylus signal generated by the asynchronous stylus, wherein the asynchronous stylus generates the stylus signal asynchronously from the touch input device, and the stylus signal generated by the asynchronous stylus has a start time and an end time, and generating one or more metrics pertaining to the received stylus signal, the metrics comprising a first time corresponding to an estimated start time of the received stylus signal and a second time corresponding to an estimated end time of stylus signal transmission;
    an arbiter coupled to the plurality of stylus signal detectors and capable of:
        determining which of the plurality of stylus signal detectors has the greatest likelihood of having received the stylus signal based on the metrics transmitted by the stylus signal detectors; and
        outputting the first time and the second time from the stylus signal detector determined to have the greatest likelihood of having received the stylus signal; and
    a plurality of demodulators, each of the plurality of demodulators corresponding to one of the plurality of sense channels of the input device and configured to demodulate the received stylus signal based on the first time and the second time from the stylus signal detector determined to have the greatest likelihood of having received the stylus signal.

10. The apparatus of claim 9, further including a processor capable of configuring the input device to alternate between a touch detection mode and a stylus detection mode, wherein configuring the input device to operate in a stylus detection mode includes configuring a plurality of drive lines and a plurality of sense lines configured to receive a touch input to receive the stylus signal.

11. The apparatus of claim 10, further comprising switching hardware configured to couple each sense line of the plurality of sense lines to a stylus signal detector of the plurality of stylus signal detectors.

12. The apparatus of claim 9, wherein the one or more metrics generated by the plurality of stylus signal detectors include an estimated signal strength of the detected stylus signal.

13. The apparatus of claim 12, wherein the arbiter determines which of the plurality of detectors has the greatest likelihood of having received the stylus signal by comparing the estimated signal strengths of the plurality of detectors and determining which detector of the plurality of detectors has the greatest estimated signal strength.

14. The apparatus of claim 9, wherein the plurality of demodulators use the first time and the second time from the stylus signal detector determined to have the greatest likelihood of having received the stylus signal to facilitate a windowed demodulation of the received stylus signal.

15. The apparatus of claim 9, further comprising a frame synchronizer configured to organize the demodulated stylus signal into a frame of data, wherein the frame of data is synchronized in time to the generation of the stylus signal by the asynchronous stylus using the first time and the second time from the stylus signal detector determined to have the greatest likelihood of having received the stylus signal.

16. The apparatus of claim 9, further comprising a data extraction unit configured to extract a plurality of data from the demodulated stylus signal.

17. A non-transitory computer readable storage medium having stored thereon a set of instructions for detecting and demodulating a stylus signal generated by an asynchronous stylus, that when executed by a processor causes the processor to:
configure the touch input device to receive a stylus signal, the stylus signal generated by the asynchronous stylus, wherein the asynchronous stylus generates the stylus signal asynchronously from the touch input device, and the stylus signal generated by the asynchronous stylus has a start time and an end time;
receive the stylus signal on a touch sensor panel at a plurality of stylus signal detectors, each of the plurality of stylus signal detectors corresponding to one of a plurality of sense channels of the touch input device;
generate one or more metrics pertaining to the received stylus signal using the plurality of stylus signal detectors, the metrics comprising a first time corresponding to an estimated start time of the received stylus signal and a second time corresponding to an estimated end time of the stylus signal transmission;
determine which of a plurality of stylus signal detectors has the greatest likelihood of having received the stylus signal based on the one or more metrics; and
demodulate, at a plurality of demodulators, each of the plurality of demodulators corresponding to one of the plurality of sense channels of the input device, the received stylus signal based on the first time and the second time from the stylus signal detector determined to have the greatest likelihood of having received the stylus signal.

18. The non-transitory computer readable storage medium of claim 17, wherein configuring the touch input device to receive the stylus signal includes configuring a plurality of drive lines and a plurality of sense lines configured for receiving touch inputs to additionally receive the stylus signal.

19. The non-transitory computer readable storage medium of claim 18, wherein configuring the plurality of sense lines to receive the stylus signal includes coupling each sense line of the plurality of sense lines to a stylus signal detector of the plurality of stylus signal detectors.

20. The non-transitory computer readable storage medium of claim 17, wherein the one or more metrics include an estimated signal strength of the detected stylus signal.

21. The non-transitory computer readable storage medium of claim 20, wherein determining which of the plurality of stylus signal detectors has the greatest likelihood of having received the stylus signal includes comparing the estimated signal strengths of the plurality of detectors and determining which detector of the plurality of detectors has the greatest estimated signal strength.

22. The non-transitory computer readable storage medium of claim 17, wherein demodulating the received stylus signal based on the first time and the second time from the stylus detector determined to have the greatest likelihood of having received the stylus signal includes using the first time and the second time to facilitate a windowed demodulation of the received stylus signal.

23. The non-transitory computer readable storage medium of claim 17, wherein the processor is further caused to organize the demodulated stylus signal into a frame of data, wherein the frame of data is synchronized in time to the generation of the stylus signal by the asynchronous stylus using the first time and the second time from the stylus signal detector determined to have the greatest likelihood of having received the stylus signal.

24. The non-transitory computer readable storage medium of claim 17, wherein the processor is further caused to extract a plurality of data from the demodulated signal.

* * * * *